United States Patent [19]
Hamaguchi et al.

[11] Patent Number: 5,159,590
[45] Date of Patent: Oct. 27, 1992

[54] MULTI-SLOT CALL RELOCATION CONTROL METHOD AND SYSTEM

[75] Inventors: Naohisa Hamaguchi; Kazushi Komura; Eiichi Suezaki, all of Yokohama, Japan

[73] Assignee: Hitachi, Ltd., Tokyo, Japan

[21] Appl. No.: 584,118

[22] Filed: Sep. 18, 1990

[30] Foreign Application Priority Data

Sep. 18, 1989 [JP] Japan .................. 1-239954

[51] Int. Cl.⁵ .......................... H04Q 11/04
[52] U.S. Cl. .................. 370/58.2; 370/95.1; 370/61
[58] Field of Search .......... 370/85.2, 58.2, 95.1, 370/58.1, 61

[56] References Cited

U.S. PATENT DOCUMENTS

| | | | |
|---|---|---|---|
| 3,961,139 | 6/1976 | Bownan et al. ............. | 370/85.15 |
| 4,787,081 | 11/1988 | Waters et al. ............... | 370/67 |
| 4,788,680 | 11/1988 | Kikuchi et al. .............. | 370/68 |
| 4,905,223 | 2/1990 | Proctor et al. .............. | 370/58.2 |
| 4,912,700 | 3/1990 | Madders et al. ............ | 370/58.2 |
| 4,949,336 | 8/1990 | Hamada et al. ............. | 370/85.15 |

*Primary Examiner*—Benedict V. Safourek
*Assistant Examiner*—T. Samuel
*Attorney, Agent, or Firm*—Antonelli, Terry, Stout & Kraus

[57] ABSTRACT

A multi-slot call relocation control method and system having a multi-slot call switching system and/or transmission equipment constituted by an address control memory, address controller and address location changing circuit whereby address write and read information for a channel memory is controlled. Where unoccupied circuits are $2^N$ (N: natural number) times the basic switching unit, incoming calls with a maximum of $2^N$ basic switching units in capacity may not be switched or transmitted by the unoccupied circuits depending on their status involving the presence of other calls. In that case, calls are relocated within a frame using the fewest steps possible. This is achieved by a neural network in the address control memory of multi-slot call switching system A, the neural network learning to output a call allocation pattern such that the number of times calls are relocated becomes minimal. The information from the network makes it possible to relocate the least number of times the calls whose capacity is not more than $2^N$ basic switching unit in the channel memory. The relocation information is transmitted from switching system A to another system B, connected oppositely to system A. Using the relocation information received, system B relocates calls within a channel memory of its own.

23 Claims, 19 Drawing Sheets

| SYMBOL | BEARER RATE (kb/s) | OCCUPIED Ts NUMBER | | | | | | | | | | | | | | |
|---|---|---|---|---|---|---|---|---|---|---|---|---|---|---|---|---|
| | | 1 | 9 | 5 | 13 | 3 | 11 | 7 | 15 | 2 | 10 | 6 | 14 | 4 | 12 | 8 | 16 |
| $X_i$ | 32 | $X_1$ | | | | | | | | $X_2$ | | | | | | | |
| $Y_j$ | 16 | $Y_1$ | | | | $Y_2$ | | | | $Y_3$ | | | | $Y_4$ | | | |
| $Z_k$ | 8 | $Z_1$ | | $Z_2$ | | $Z_3$ | | $Z_4$ | | $Z_5$ | | $Z_6$ | | $Z_7$ | | $Z_8$ | |
| $W_\ell$ | 4 | $W_1$ | $W_2$ | $W_3$ | $W_4$ | $W_5$ | $W_6$ | $W_7$ | $W_8$ | $W_9$ | $W_{10}$ | $W_{11}$ | $W_{12}$ | $W_{13}$ | $W_{14}$ | $W_{15}$ | $W_{16}$ |

FIG. 5

| | Ts No. | $W_\ell$ | $Z_k$ | $Y_j$ | $X_i$ |
|---|---|---|---|---|---|
| | 1 | $W_1$ | $Z_1$ | $Y_1$ | $X_1$ |
| | 2 | $W_9$ | $Z_5$ | $Y_3$ | $X_2$ |
| | 3 | $W_5$ | $Z_3$ | $Y_2$ | $X_1$ |
| EXAMPLE OF FIG. 1 | 4 | $W_{13}$ | $Z_7$ | $Y_4$ | $X_2$ |
| | 5 | $W_3$ | $Z_2$ | $Y_1$ | $X_1$ |
| | 6 | $W_1$ | $Z_6$ | $Y_3$ | $X_2$ |
| | 7 | $W_7$ | $Z_4$ | $Y_2$ | $X_1$ |
| | 8 | $W_{15}$ | $Z_8$ | $Y_4$ | $X_2$ |
| | 9 | $W_2$ | $Z_1$ | $Y_1$ | $X_1$ |
| | 10 | $W_{10}$ | $Z_5$ | $Y_3$ | $X_2$ |
| | 11 | $W_6$ | $Z_3$ | $Y_2$ | $X_1$ |
| EXAMPLE OF FIG. 2 | 12 | $W_{14}$ | $Z_7$ | $Y_4$ | $X_2$ |
| | 13 | $W_4$ | $Z_2$ | $Y_1$ | $X_1$ |
| | 14 | $W_{12}$ | $Z_6$ | $Y_3$ | $X_2$ |
| | 15 | $W_8$ | $Z_4$ | $Y_2$ | $X_1$ |
| | 16 | $W_{16}$ | $Z_8$ | $Y_4$ | $X_2$ |

⊘ ALLOCATED

○ UNALLOCATED

FIG. 7(a)

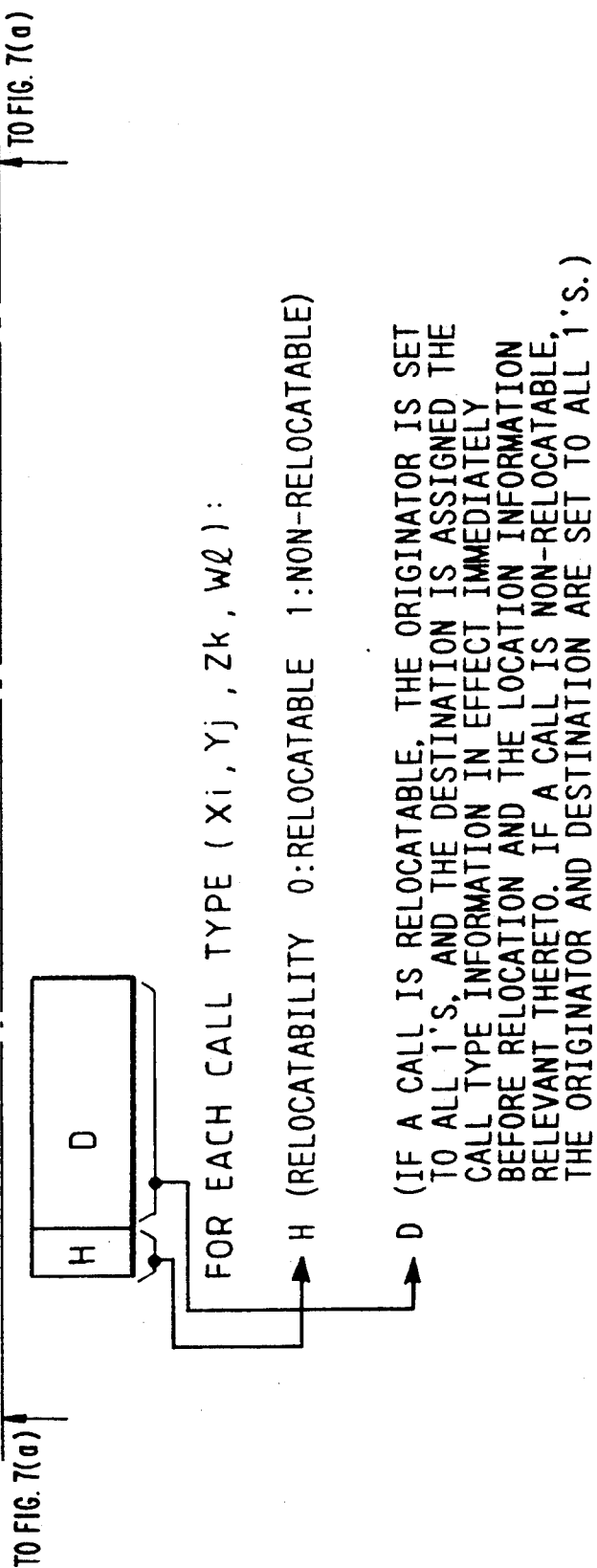

INPUT/OUTPUT CONDITIONS FOR ADDRESS CONTROLLER AND OVERVIEW OF THE PROCESSING

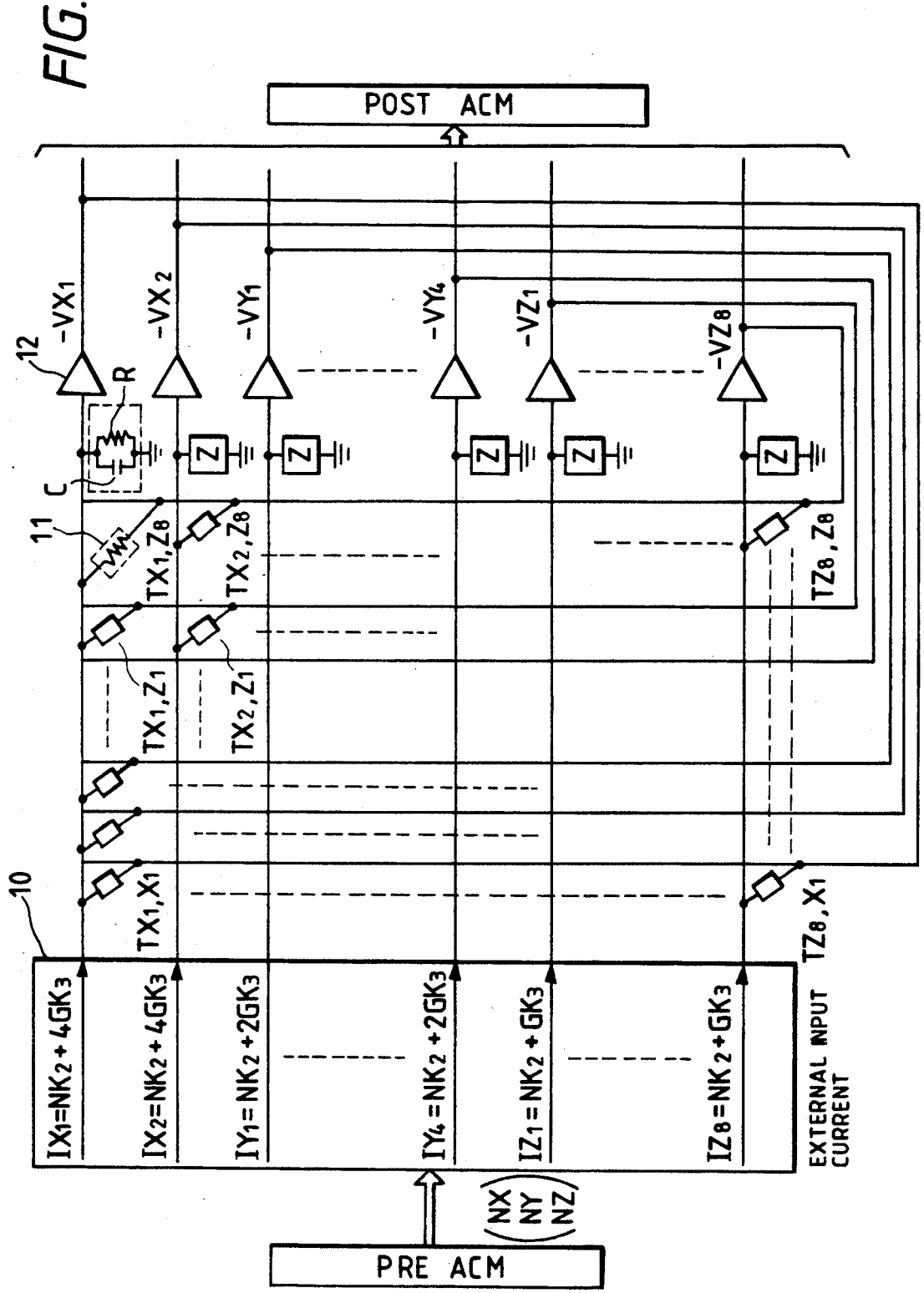

NEURON MODEL

INPUT/OUTPUT CHARACTERISTIC OF NEURON $\omega_{1ji}$ ····· WEIGHT COEFFICIENT OF THE LINK CONNECTING NEURON i IN THE INPUT LAYER WITH NEURON j IN THE HIDDEN LAYER $\omega_{2kj}$ ····· WEIGHT COEFFICIENT OF THE LINK CONNECTING NEURON j IN THE HIDDEN LAYER WITH NEURON k IN THE OUTPUT LAYER FIG. 15(a)
FIG. 15(b)
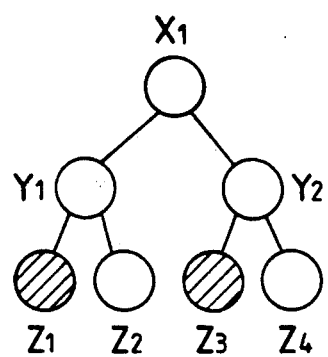
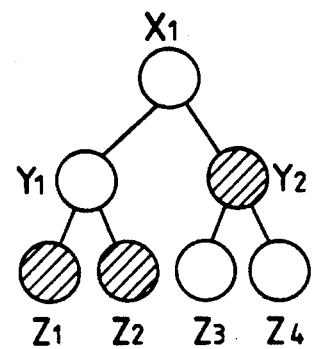
⊘ ---- OCCUPIED BY CALL
◯ ---- UNOCCUPIED and RELATED ART

MULTI-SLOT CALL RELOCATION CONTROL METHOD AND SYSTEM

BACKGROUND OF THE INVENTION AND RELATED ART

The present invention relates to a method for controlling multi-slot calls in order to efficiently utilize exchanges and their associated transmission equipment which are the major facilities for implementing multi-slot call communication of audio and data signals at different transmission rates. The invention also relates to a multi-slot call switching system and its associated transmission equipment operating on this method.

As discussed in a journal of the Institute of Electronics, Information and Communication Engineers (B-I, Vol. J72-B-I, No. 4, pp. 255-263, April, 1988), there are four representative prior art methods for improving the availability of telephone circuits for calls:

(1) Trunk reservation method

The trunk reservation method involves leaving a certain number of telephone circuits unoccupied in preparation for the incoming of priority calls. The remaining circuits are shared by priority and non-priority calls.

(2) Split high-usage group method

The split high-usage group method involves virtually splitting the telephone circuits into two groups, one shared by both priority and non-priority calls and the other dedicated to the priority calls only. The dedicated circuit group is placed before the shared circuit group to implement control over the loss probability by call type. The loss of priority calls ultimately occurs in the shared circuit group.

(3) Split final group method

The split final group method also involves virtually splitting the circuits into two groups, one shared by both priority and non-priority calls and the other dedicated to the priority calls only. What differs from the split high-usage group method is that the dedicated circuit group is placed after the shared circuit group to implement control over the loss probability by call type. Priority calls are allowed to select circuits first in the shared circuit group and then in the dedicated circuit group.

(4) Virtual circuit method

According to the virtual circuit method, the maximum number of concurrently connectable non-priority calls is set for N-v; if the number of concurrently connected non-priority calls is N-v upon arrival of a non-priority call, that non-priority call is treated as a loss.

By any of the methods outlined above, once circuits are reserved for calls, the circuits stay reserved until the calls terminate. Even upon arrival of calls that require less than the capacity of available circuits, the calls may not be connected because of the chronological call order that must be maintained. This often results in inefficient uses of telephone circuits.

The above prior art is generally practiced as follows. Where $2^N$ (N: natural number) basic switching units are handled in a channel memory constituting a multi-slot call switching system, the calls are written to or read from the memory or they occupy transmission circuits in keeping with certain rules upholding the preservation of the chronological call order. One disadvantage of the prior art is that these rules may prevent the switching of $2^N$ basic switching units even if the capacity of the channel memory or of the available transmission circuits is equal to or more than the $2^N$ basic switching units.

OBJECT AND SUMMARY OF THE INVENTION

It is therefore an object of the present invention to provide a multi-slot call relocation control method which ensures the switching or transmission of $2^N$ or fewer basic switching units whenever the capacity of available circuits for the channel memory is equivalent to the $2^N$ basic switching units.

It is another object of the present invention to provide a multi-slot call relocation control method which, when current calls within a frame or on transmission circuits are to be relocated so that new calls may be switched or transmitted, conducts the relocating with minimum steps taken regardless of the call allocation pattern within the frame.

It is a further object of the present invention to provide a switching system along with transmission equipment on which to implement the above multi-slot call relocation control method.

In achieving the foregoing and other objects of the present invention and according to one aspect thereof, there is provided a method comprising, when the number of unallocated time slots within a frame is greater than the number of time slots of newly generated multi-slot calls, and when other multi-slot calls are not yet allocated to available locations to which the newly generated multi-slot calls can be allocated, the step of allocating the other multi-slot calls to the available locations; and when the number of unallocated time slots within the frame is greater than the number of time slots of the newly generated multi-slot calls and when other multi-slot calls with fewer time slots than those of the newly generated multi-slot calls are allocated to available locations to which the newly generated multi-slot calls can be allocated, the step of relocating the other multi-slot calls to other unoccupied locations while allocating the newly generated multi-slot calls to the available locations.

According to another aspect of the present invention, there is provided a method comprising, where there are $2^{N-n}$ time slots ($1 < n < N$; n is integer) for other multi-slot calls located in a plurality of locations to which the multi-slot calls occupying $2^N$ time slots can be allocated, the step of relocating to other unoccupied locations those of the other multi-slot calls which are so located as to maximize the value n, before locating the multi-slot calls which occupy the $2^N$ time slots.

According to a further aspect of the present invention, there is provided a system comprising an address control memory for controlling address information used by exchanges or by transmission equipment writing and reading addresses to and from a channel memory, and an address controller for allowing address locations to be altered. The address controller contains a neural network that has learned beforehand steps to minimize the number of times calls are relocated depending on the call status within a frame and on the type of calls generated. The capacity of unoccupied circuits for the exchanges or transmission lines is equivalent to $2^N$ (N: natural number) basic switching units. Where a number of calls whose capacity is less than that of the $2^N$ basic switching units have reached the unoccupied circuits, other calls may prevent the new arrivals from being switched or transmitted due to the presence of other calls in the circuits. In such a case, a multi-slot call switching system A, based on the information from the address control memory, relocates within the channel memory a number of calls whose capacity is less than that of the new calls by use of the steps to minimize the number of times for call relocation. In this way, the circuits for switching the new calls are secured. The neural network in the address control memory has learned beforehand so that when calls are to be relocated, the network outputs a call allocation pattern whereby the number of times the calls are relocated is minimized. The address information about the relocated calls is transmitted to the opposite multi-slot call switching system B. Upon receipt of the relocation information, the multi-slot call switching system B relocates the calls within the channel memory belonging thereto. In this manner, multi-slot calls are switched or transmitted while the chronological call order is maintained all the time.

BRIEF DESCRIPTION OF THE DRAWINGS

FIG. 5 is a table showing how calls are located in the channel memory of the embodiment;

Figure 7A:
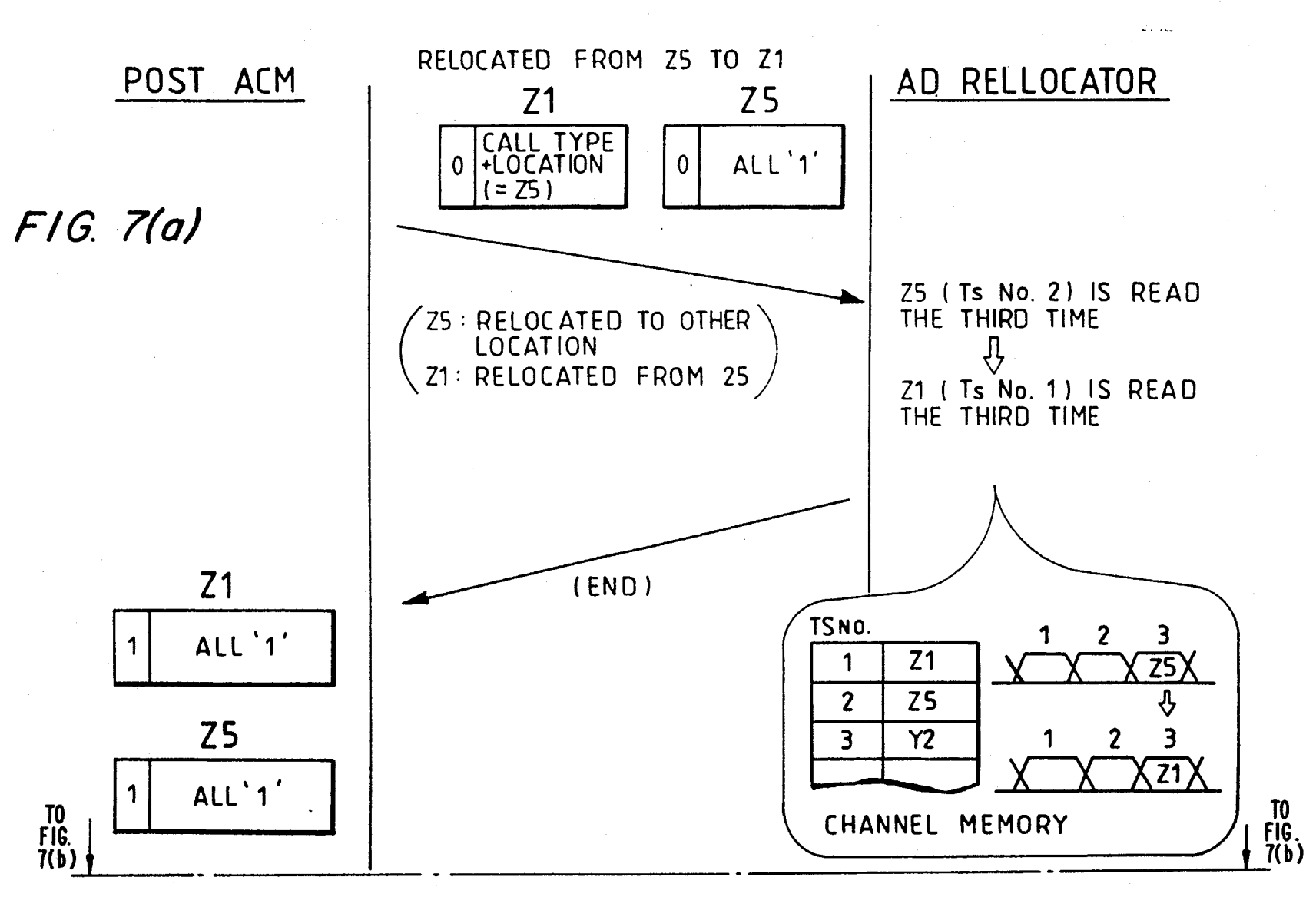

FIGS. 7(a) and 7(b) are a view of how relocation information is transmitted;

FIG. 13 is a circuit diagram of an address controller that uses a neural network;

FIG. 15(a) is a view of a tree model expressing an input pattern vector example;

FIG. 15(b) is a view of a tree model expressing the ideal output of the address controller in effect when a call type Y is generated in the state of FIG. 15(a);

DETAILED DESCRIPTION OF PREFERRED EMBODIMENT

Figure 1A:
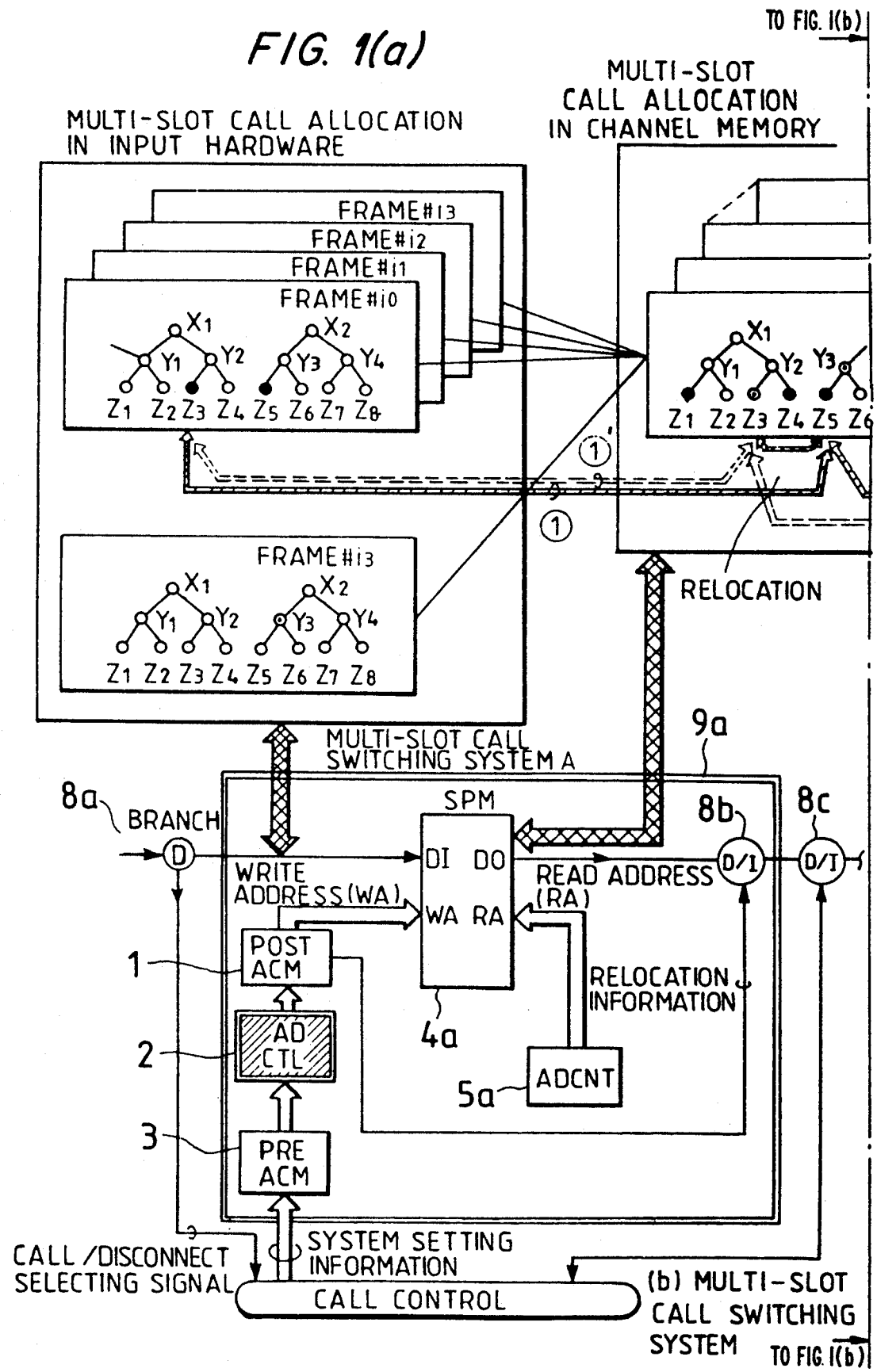
FIGS. 1(a) and 1(b) are a block diagram of a multi-slot call switching system embodying the present invention, along with a general view of how call relocation control is implemented by the embodiment.
Figure 1B:
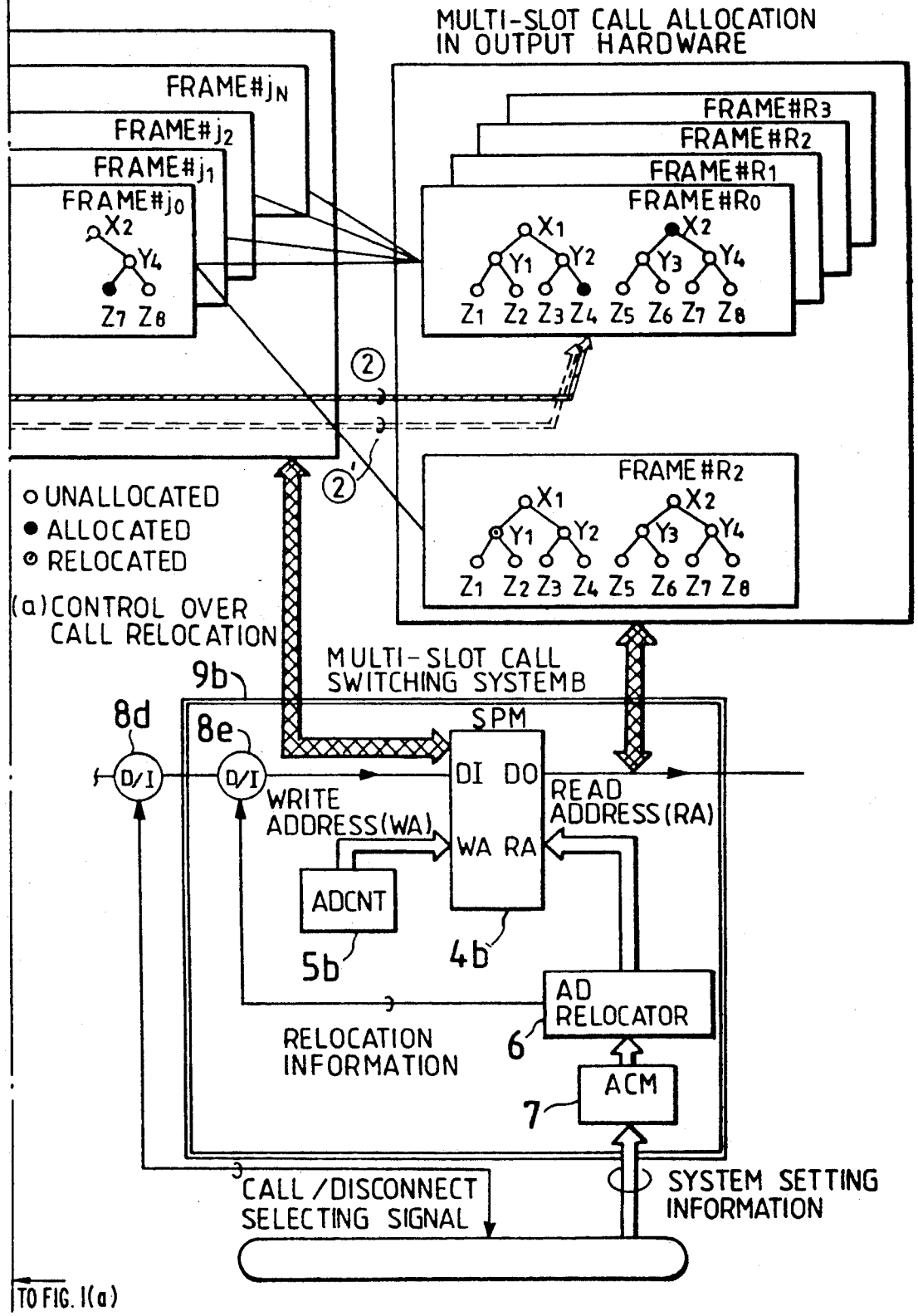

Preferred embodiments of the present invention will now be described in detail by referring to the accompanying drawings. FIG. 1 illustrates the construction of a multi-slot call switching system embodying the invention, the system constituting the major portion thereof.

The multi-slot call switching system has an address controller 2 that controls the relocation of multi-slot calls. The target calls to be switched by the system are calls with a bearer rate of 64 kb/s$\times 2^{-N}$ (N: integer). A channel memory attached to the system is a double buffer type. The basic switching unit is the lowest bearer rate. The range of multi-slot call switching circuits is represented by S ($0 < S < So$; So is the line capacity determined by loss probability).

Under switching control, the up data highway is operated on a random write, sequential read type basis, and the down data highway on a sequential write, random read basis. Random write operations are controlled by a two-stage control arrangement involving a call controller and an address controller. Sequence read operations are controlled by another two-stage control arrangement involving a call controller and an address relocator.

The address controller (ADCTL) is a key component of the embodiment that implements optimum call allocation control by use of neural network circuits.

I. Configuration conditions

Prior to the detailed description of how the multi-slot call switching system is constructed and operated, there are three topics that need to be discussed: (1) types of multi-slot calls, (2) frame configuration, and (3) tree models.

I. 1. Types of multi-slot calls

I. 1.1. Handling of data signals

Data signals are all converted to the 64 kb/s universal format. The coded data signal has a bit repeat rate of 64 kb/s in that a bearer signal of n kb/s is repeated 64/n times in units of octets.

I. 1.2. Handling of audio signals

Audio signals fall within a band width ranging from 12 kb/s to 64 kb/s, which is called the telephone quality region. Already, there have been audio signals practiced at 32 kb/s, 24 kb/s, 16 kb/s and lower than 16 kb/s by use of such coding methods as ADPCM and ADM. Signals of these rates are handled as audio signals.

I. 1.3. Sequencing of bearer rates for multi-slot calls

The bearer rates for multi-slot calls are all sequenced at 64 kb/s$\times 2^{-N}$ (N: integer). The sequencing is carried out to simplify the frame structure and to facilitate control over switching processing, particularly over call relocation.

I. 2. Frame structure

Figure 2A:
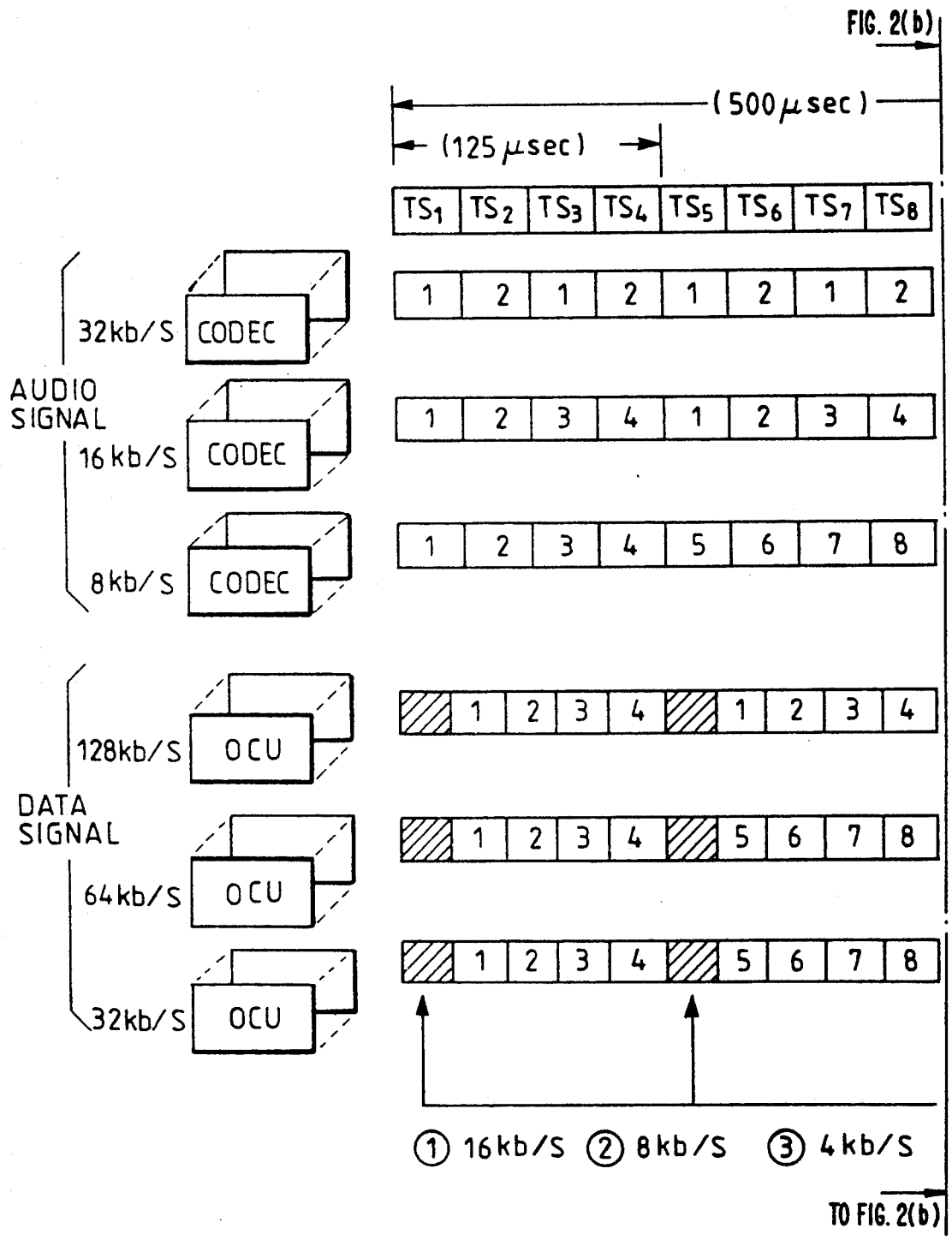
FIGS. 2(a) and 2(b) are a view showing how audio and data signals are configured within a frame with the embodiment.
Figure 2B:
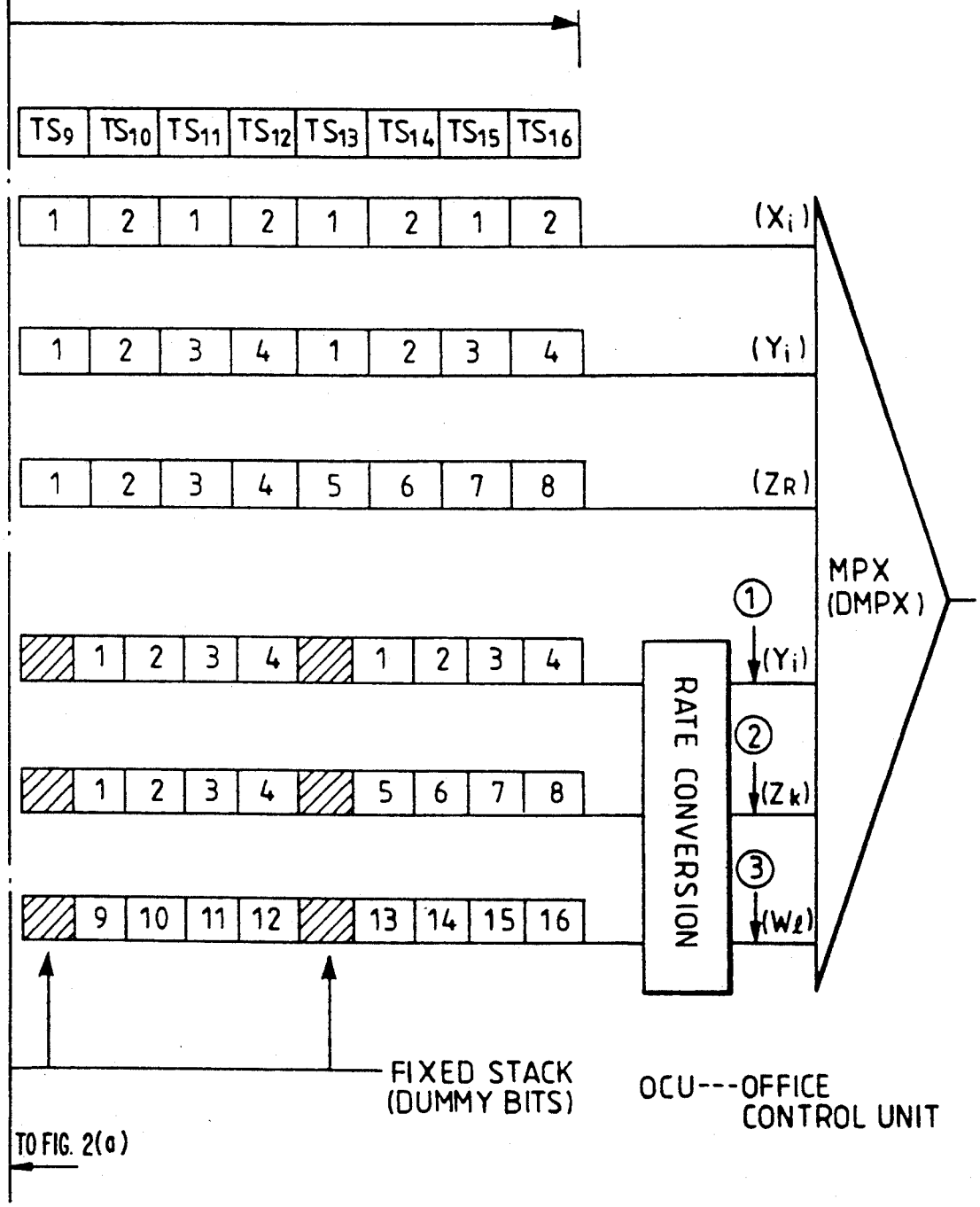

The multi-slot calls ($N > 0$) of 64 kb/s or lower mentioned above, whether they are data signals or audio signals, may be handled without distinction by use of the frame structure depicted in FIG. 2. This way of handling signals may be generally applied to calls of 64 kb/s$\times 2^{-N}$ (N: integer).

There are two methods for allocating calls with bearer rates of 8 kb/s, 16 kb/s and 32 kb/s to be allocated within 64 kb/s: an intra-octet dispersed allocation method and an intra-octet concentrated allocation method. The intra-octet dispersed allocation method is a method whereby calls are allocated on the data highway at intervals of the respective bearer rates (intra-octet dispersed allocation). The intra-octet concentrated allocation method is a method whereby the same call is repeated for concentrated allocation on the data highway. In this embodiment, the intra-octet dispersed allocation method is employed.

I. 2. 1. Sequencing of information at 64 kb/s×$2^{-N}$

The rate of data to be handled may or may not conform to 64 kb/s×$2^{-N}$ (N: integer). Thus fixed stacks are inserted to put the data rates in sequence. Multi-slot calls are classified as shown in FIG. 3 where, $X_i$ (i=1, 2): calls sequenced at bearer rate of 32 kb/s
$Y_j$ (j=1-4): calls sequenced at bearer rate of 16 kb/s
$Z_k$ (k=1-8): calls sequenced at bearer rate of 8 kb/s
$W_l$ (l=1-16): calls sequenced at bearer rate of 4 kb/s.

I. 3. Tree model

Figures 3, 4:
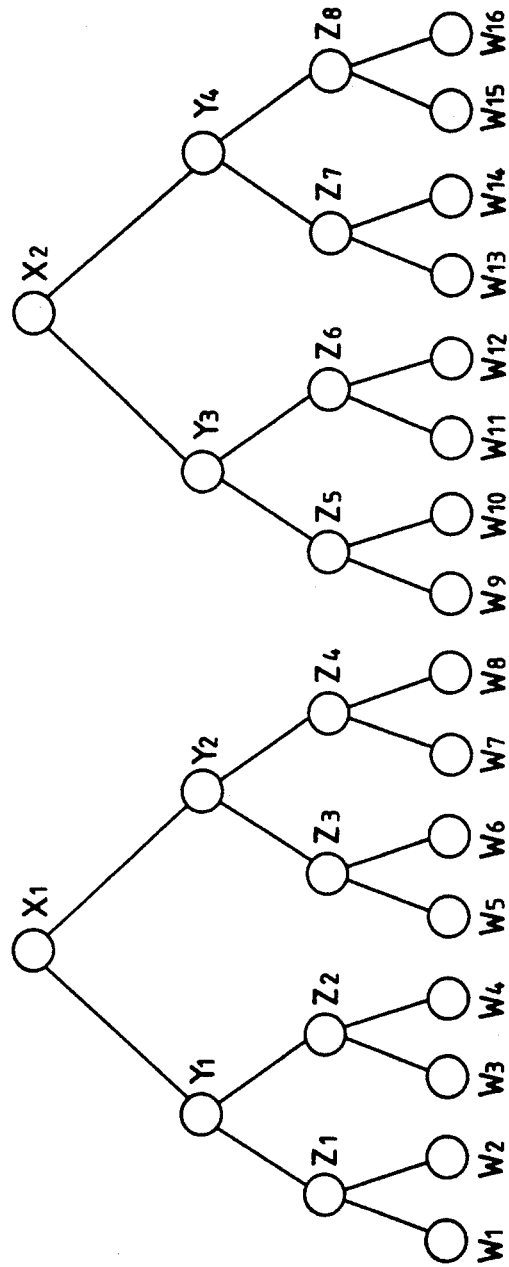
FIG. 3 is a classification table of multi-slot calls.
FIG. 4 is a view describing the general tree model.

The tree model shown in FIG. 4 is derived from the classification of multi-slot calls in FIG. 3. The components of this tree model have the following meanings:

(1) Call type $X_i$ (i=1, 2) may be allocated on condition that low-order call types Y1 and Y2 (i=1), Y3 and Y4 (i=2), Z1 through Z4 (i=1), Z5 through Z8 (i=2), W1 through W8 (i=1), and W9 through W16 (i=2) are not allocated altogether.

(2) Call type $Y_j$ (j=1-4) may be allocated on condition that low-order call types Z1 and Z2 (j=1), Z3 and Z4 (j=2), Z5 and Z6 (j=3), Z7 and Z8 (j=4), W1 through W4 (j=1), W5 through W8 (j=2), W9 through W12 (j=3), and W13 through W16 (j=4) are not allocated, and that high-order call types X1 (j=1, 2) and X2 (j=3, 4) are not allocated either.

(3) Call type $Z_k$ (k=1-8) may be allocated on condition that low-order call types W1 and W2 (k=1), W3 and W4 (k=2), W5 and W6 (k=3), W7 and W8 (k=4), W9 and W10 (k=5), W11 and W12 (k=6), W13 and W14 (k=7), and W15 and W16 (k=8) are not allocated, and that high-order call types X1 (k=1-4), X2 (k=5-8), Y1 (k=1, 2), Y2 (k=3, 4), Y3 (k=5, 6), and Y4 (k=7, 8) are not allocated as well.

(4) Call type $W_l$ (l=1-16) may be allocated on condition that high-order call types X1 (l=1-8), X2 (l=9-16), Y1 (l=1-4), Y2 (l=5-8), Y3 (l=9-12), Y4 (l=13-16), Z1 (l=1, 2), Z2 (l=3, 4), Z3 (l=5, 6), Z4 (l=7, 8), Z5 (l=9, 10), Z6 (l=11, 12), Z7 (l=13, 14) and Z8 (l=15, 16) are not allocated altogether.

Where signals are treated as described, multi-slot calls may be handled uniformly as digital signals of 8×n kb/s. It is thus apparent that all signals can be handled uniformly regardless of the value N being positive or negative.

II. Multi-slot call switching system

The construction of the multi-slot call switching system will now be described in detail with reference to FIG. 1.

II. 1. Construction of multi-slot call switching system

FIG. 1 describes how the multi-slot call switching system is constructed according to the invention.

II. 1. 1. Channel memory (SPM)

A channel memory (SPM) 4a is a double buffer type memory capable of satisfying the need to retain the chronological order of calls.

Calls on the input side of the hardware are handled on a random write, sequential read basis; calls on the output side of the hardware are handled on a sequential read, random write basis.

Data is written to and read from the channel memory under the conditions given in FIG. 3. FIG. 5 depicts an example of allocating multi-slot calls in the channel memory.

The basic switching unit is the lowest bearer rate. In the example of FIG. 3, call type Wl, i.e., 4 kb/s, is the basic switching unit. This requires the channel memory to have a capacity large enough to accommodate 16 time slots per frame. In the example of FIG. 1, call type Zk, i.e., 8 kb/s, is the basic switching unit. This requires the channel memory to have a capacity large enough to accommodate 8 time slots per frame.

II. 1. 2. Address controller

Two kinds of address controller are provided: an input hardware write address controller, and an output hardware read address controller. Below is a description of each of these address controllers.

(1) Input hardware write address controller

The input hardware write address controller comprises a pre-address control memory (PRE ACM) 3, a post-address control memory (POST ACM) 1 and an address controller (AD CTL) 2. The functions of these components are outlined in Table 1 below.

TABLE 1

| Function name | Description |
|---|---|
| PRE ACM (pre-address control memory) | Receives for storage the frame number to be switched and the information about the type of call (X, Y, Z, W) generated or terminated from the call controller. |
| AD CTL (address controller) | Allocates and relocates calls according to the information from PRE ACM. |
| POST ACM (post-address control memory) | Converts the call type-wise location information from AD CTL to address information and, if a change in address location is detected and carried out, sends the changed information to the address relocator of the opposite multi-slot call switching system. |

(2) Output hardware read address controller

The output hardware read address controller comprises an address control memory (ACM) 7 and an address relocator (AD RELOCATOR) 6. The functions of these components are outlined in Table 2 below.

TABLE 2

| ACM (address control memory) | Receives the frame number to be switched and the call type-wise location information from the call controller. |
|---|---|
| AD RELOCATOR (address relocator) | Upon receipt of relocation information from AD CTL (address controller) of the upstream multi-slot call switching system changes the read address locations in the channel memory (SPM) without altering the call allocation in the output hardware. |

II. 2. Relocation control and the method for call transmission involved

II. 2. 1. Need for relocation control

Figure 6A:
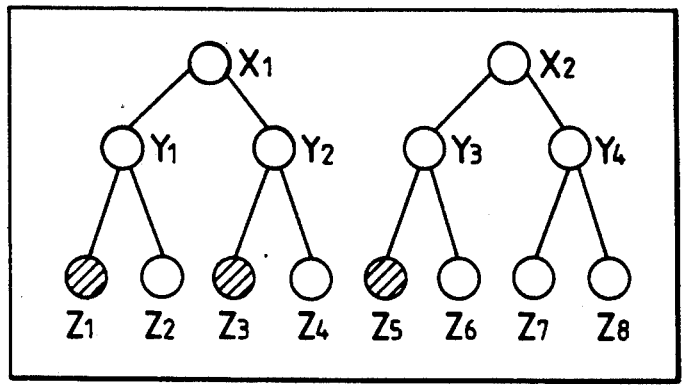
FIGS. 6(a) and 6(b) are a set of view depicting how calls are located in a multi-slot call tree model.
Figure 6B:
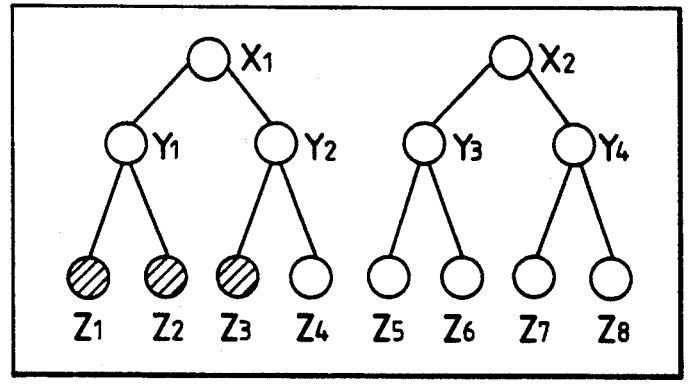

The most desirable multi-slot call switching system is a system which, given a certain number of available circuits in the channel memory to accommodate calls, always locates calls whose capacity is less than that of the available circuits. However, the condition of preserving the chronological call order sometimes results in the inability of such a system to allocate calls even if their capacity is less than that of the available circuits, depending on the allocation status in the channel memory. FIG. 6(a) shows an example in which four Zk calls are allocated within a frame so that Xi calls cannot be allocated anew. Since four circuits are available with this example, one X call, two Y calls, one Y call and two Z calls, or four Z calls may be allocated anew. That is, if Zk calls are allocated as illustrated in FIG. 6(b), up to four Z calls, two Y calls or one X call may be allocated anew.

Because calls are randomly generated and terminated in practice, it is sometimes unavoidable to have a situation in which calls are allocated as in FIG. 6(a).

The embodiment of the present invention controls the relocation of calls in order to avoid the situation of FIG. 6(a). Relocation control by the embodiment typically involves relocating calls so as to deal with, say, new calls Xi generated in the state of FIG. 6(a). The resulting state under relocation control is shown in FIG. 6(a). In this case, call Z5 is relocated to Z2 while Z1 and Z3 are allowed to remain where they are. This scheme makes it possible to utilize available circuits efficiently and to minimize the number of calls to be relocated.

II. 2. 2. Method for transmitting relocation information

What follows is a description of how relocation information is transmitted between the post-address control memory (POST ACM) and the address relocator connected thereto. In FIG. 4, where call Z5 is relocated to Z1, the relocation information relevant thereto is transmitted as indicated. Using the relocation information from the post-address control memory, the address relocator changes the read addresses for the channel memory. Upon completion of the change, the post-address control memory considers the information after the relocation to be the most recent write address information. This allows the address controller to receive subsequent relocation information.

III. Construction of address controller circuits (a)

The present invention is characterized in that the address controller of the multi-slot call switching system controls the relocation of calls. Below is a detailed description of a first embodiment of the address controller according to the invention.

III. 1. Neural network

Prior to the description of the controller construction, the requirements for the neural network constituting the address controller circuits in the first embodiment of the address controller are discussed below.

Figure 8B:
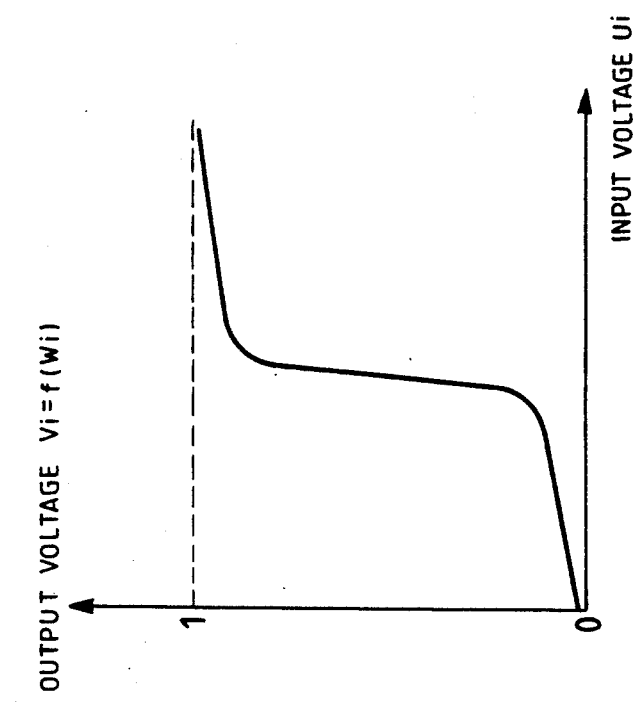
FIG. 8(b) is a view showing the input/output characteristic of an amplifier modeled after a neuron cell.
Figure 8A:
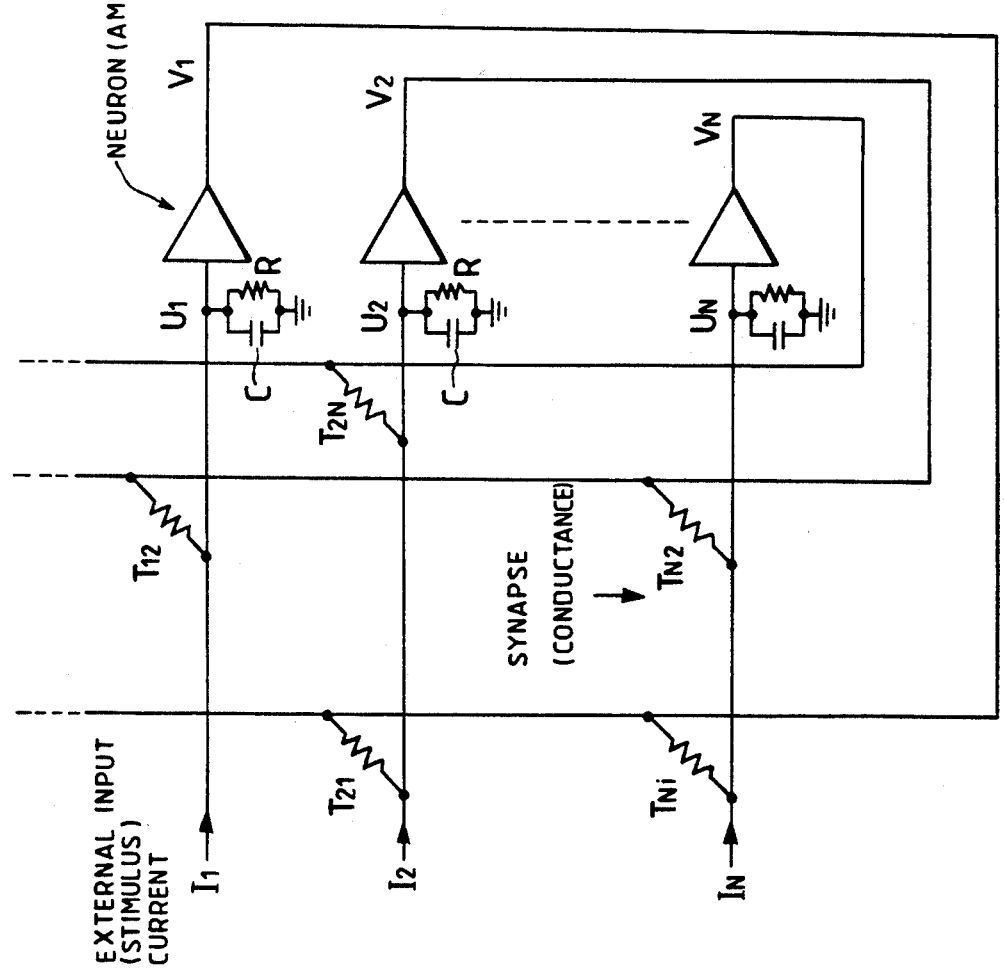
FIG. 8(a) is a view illustrating a model analog circuit of the Hopfield type neural network.

The neural network is a network that interconnects neurons, the elements of the brain, with synapses. Amplifiers whose characteristic is shown in FIG. 8(b) are modeled after neurons, and the conductance thereof is modeled after synapses. FIG. 8(a) depicts an analog circuit of the Hopfield type neural network.

In FIG. 8(a), an external input current Ii represents an external stimulus. The neural network is capable of computations at high speeds thanks to the numerous neurons thereof carrying out parallel processing. These features allow the neural network to contribute significantly to pattern recognition and comprehensive decision applications.

Table 3 below lists the results of comparing the functions of the address controller (AD CTL) with the features of neural network.

TABLE 3

Comparing functions required of address controller with features of neural network

| No. | Functions required of address controller | Features of neural network |
|---|---|---|
| 1 | One process should end within one frame. Real-time processing is needed. | The network provides parallel processing at high speed. |
| 2 | Optimum relocation control is required. | The network is suitable for solving optimization problems. |
| 3 | The logic should be as small as possible in scope. | The network may be implemented with simple circuits using amplifiers, resistors and capacitors. |

The comparison above indicates that the neural network has features suitable for use in an address controller. From a large number of neural network variations, this embodiment has adopted a neural network of the Hopfield type considered to be fit for solving optimization problems. The operation of the electronic circuit in FIG. 8(a) is given by the following equation:

$$\frac{dUi}{d\tau} = \frac{Vi}{\tau} + \sum_{j=1}^{N} T_{i,j} vj + Ii \quad (1)$$

where, Ui is the input to the amplifier arrangement, Vi is the output therefrom (=f(Ui)), and $\tau = RC$.

Where synapses are connected symmetrically (Tij=Tji) and the rise time for the amplifiers is sufficiently short, the system of equation (1) has the following energy function:

$$E = -\frac{1}{2} \sum_{i=1}^{N} \sum_{i=1}^{N} T_{i,j} V_{i,j} - \sum_{i=1}^{N} Vi\, Ii \quad (2)$$

and converges on a certain stabilized state. At this point, the output of each amplifier representing a neuron is known to converge on either 1 or 0.

III. 2. Conversion from tree model to neural network

How a tree model is converted to a neural network will now be described using three call types Xi, Yj and Zk.

| <<Input/output characteristic of neurons>> | |
|---|---|
| UX1: input of X1 | VX1: output of X1 |
| UY1: input of Y1 | VY1: output of Y1 |
| UZ1–UZ4: input of Z1–Z4 | |
| VZ1–VZ4: output of Z1–Z4 | |

Figure 9:
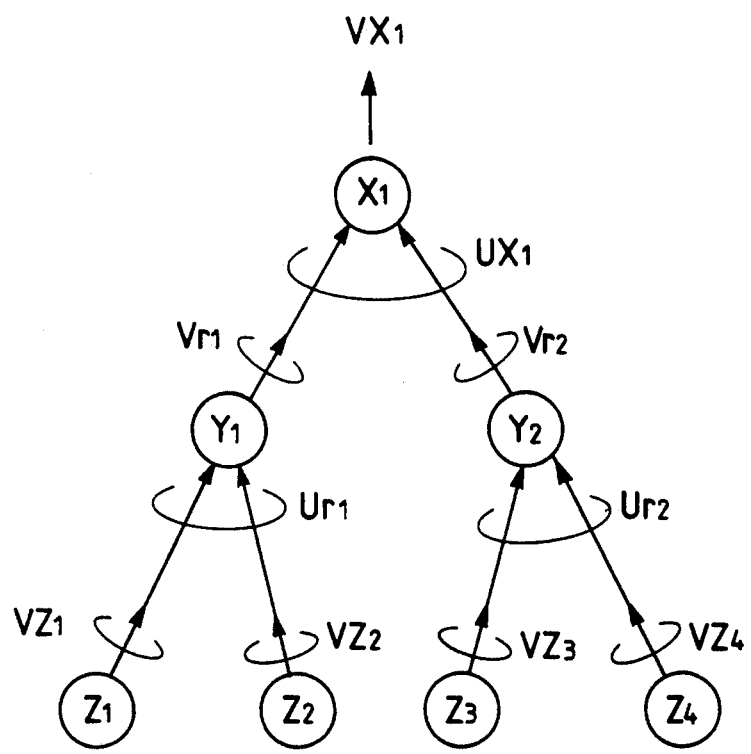
FIG. 9 is a view depicting the conversion from a tree model to a neural network.

Each of Xi, Yj and Zk calls corresponds to a neuron. The connection between neurons is defined as shown in FIG. 9. The input/output characteristic of each neuron conforms to the output voltage Vi (Vi=f(Ui), where i=X1, Y1, ...) depicted in FIG. 8(b).

III. 3. Call allocation status and neuron status

Where a neural network is constructed as shown in FIG. 9, the calls are related to the neurons in terms of status as follows. When a call is allocated, that means the corresponding neuron is stimulated; when a call cannot be allocated, that means the corresponding neuron cannot be simulated; when a call has yet to be allocated, that means the corresponding neuron is being inhibited.

III 4. Input/output conditions for address controller (AD CTL) and processing thereof To solve the problem of optimum call allocation by use of the Hopfield type neural network requires expressing the problem with the energy function of equation (2). Once the energy function is determined, Tij and Ii are also determined for implementation of the neural network.

Figure 10A:
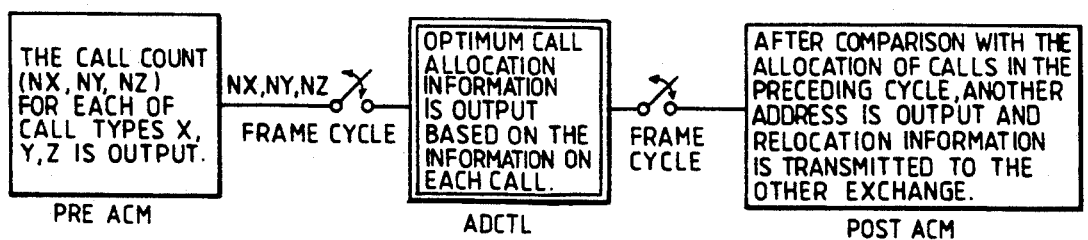
FIG. 10 is a general view illustrating the input/output conditions for the address controller of the embodiment along with the processing performed by the controller.
Figure 10B:
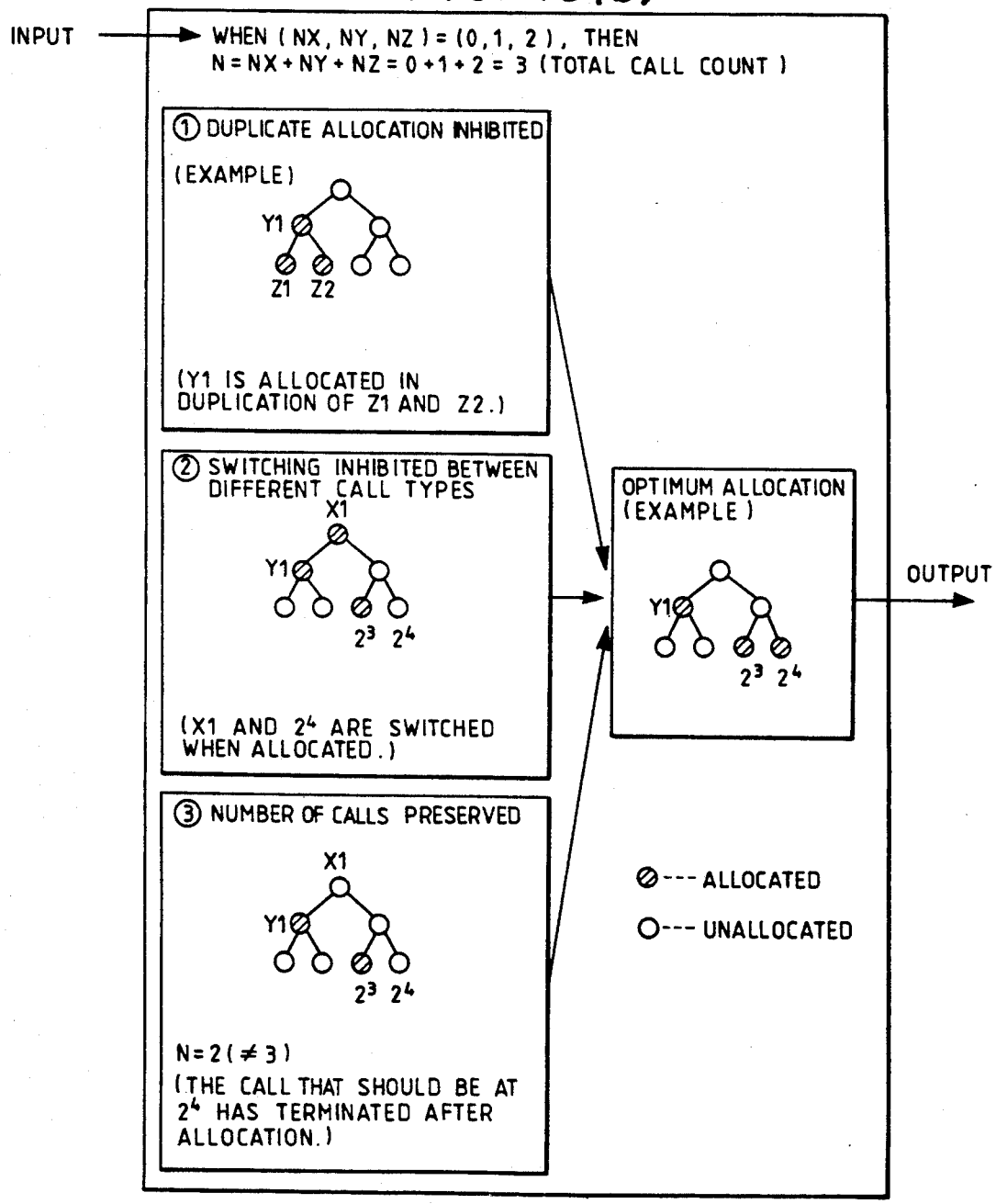

An example is assumed in which eight times slots are allocated per frame when Tij and Ii are to be determined. FIG. 10 indicates the input/output conditions for the address controller (AD CTL) and an outline of the processing done by the controller.

Calculation of energy function E (i) Prohibiting conditions

The status of the address controller is expressed by the energy function Ei. First, calls are allocated so that the value of the energy function Ei may be maximized under the inhibiting conditions of (1) through (3) of FIG. 10. That is, the conductance Tij and the external input current Ii are obtained so that the value of equation (2) may be maximized when the circuit of FIG. 8(a) is stablized.

Each of the allocation patterns for computing this optimum allocation problem is expressed using X1, X2, Y1 through Y4, and Z1 through Z8 in the tree model. Each of the 14 calls X1 through Z8 is made to correspond to one neuron. The outputs of the neurons are VX1 through VZ8.

The energy function E is determined so that a neuron corresponding to an allocated call may have an output of 1 and that a neuron corresponding to an unallocated call may have an output of 0. This allows the value E to be maximized under the inhibiting conditions.

It is assumed that the numbers of calls belonging to call types X, Y and Z are NX, NY and NZ, respectively. Then the inhibiting conditions regarding the call allocation in FIG. 10 are expressed as follows.

(1) Condition of inhibiting duplicate allocation

Figure 11:
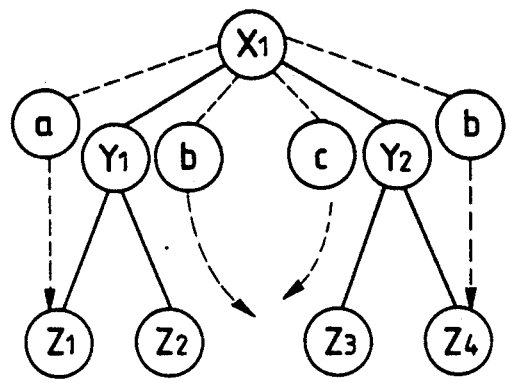
FIG. 11 is a view of a tree model indicating the conditions for prohibiting duplicate allocation of calls.

The condition of inhibiting duplicate allocation, in the case of FIG. 11 where the tree is traced from branch "a" to branch "d," dictates that there should be no call or should be only one call that may be allocated to each of branches "a" to "d." This is the minimum energy state. With respect to "a," all of VX1, VY1 and VZ1 must be zero or only one thereof must be 1 so that VX1 VY1+VY1 VZ1+VZ1 VX1=0. The same holds true for "b" through "d." From this, the energy function $E_1$ is obtained as follows:

$$E_1 = \frac{1}{2} K_1 (VX1 \cdot VY1 + VX1 \cdot VY2 + VY1 \cdot VZ1 + \quad (3)$$

$$VY1 \cdot VZ2 + VY2 \cdot VZ3 + VY2 \cdot VZ4 + VX1 \cdot VZ1 + VX1 \cdot$$

$$VZ2 + VX1 \cdot VZ3 + VX1 \cdot VZ4 + VX2 \cdot VY3 + VX2 \cdot VY4 +$$

$$VY3 \cdot VZ5 + VY3 \cdot VZ6 + VY4 \cdot VZ7 + VY4 \cdot VZ8 + VX2 \cdot$$

$$VZ5 + VX2 \cdot VZ6 + VX2 \cdot VZ7 + VX2 \cdot VZ8)$$

where, $K_1$ is a positive constant.

(2) Condition of preserving the number of calls

The number of calls must remain unchanged before and after allocation by the address controller (AD CTL). If the total number of calls before the allocation is N (=NX+NY+NZ), the number thereafter must also be N. This condition is expressed by the following equation:

$$E_2 = \frac{K_2}{2} \left( \sum_{j=1}^{2} VXi + \sum_{i=1}^{4} VYi + \sum_{i=1}^{8} VZi - N \right)^2 \quad (4)$$

where, N=NX+NY+NZ, and $K_2$ is a positive constant.

When N is first given as the input, the result of equation (4) is 0 only when the difference is 0 between the total number of calls and the number of calls for which the value of neuron outputs VX1 through VZ8 is 1 (where calls are allocated), i.e., when the number of incoming calls is equal to the number of outgoing calls.

(3) Condition of inhibiting relocation of different call types

Different call types must not be relocated in terms of chronological order. Call types X, Y and Z respectively occupy four circuits, two circuits and one. Therefore the total circuit capacity G is given by the following equation:

$$G = 4 \times NX + 2 \times NY + 1 \times NZ \quad (5).$$

If the total number of calls N (=NX+NY+NZ) remains unchanged (equation (4)) and if the total circuit capacity G is also unchanged, there is no possibility of different call types getting relocated. Thus the following equation is obtained:

$$E_4 = \frac{K_3}{2} \left( 4 \sum_{i=1}^{2} VXi + 2 \sum_{j=1}^{4} VYi + \sum_{i=1}^{8} VZi - G \right)^2 \quad (6)$$

where, $K_3$ is a positive constant.

The foregoing equations (3), (4) and (6) obtained under the conditions (1) through (3) above provide the energy function allowing calls to be allocated without inconsistency.

(ii) Conditions for optimum allocation

Figure 12:
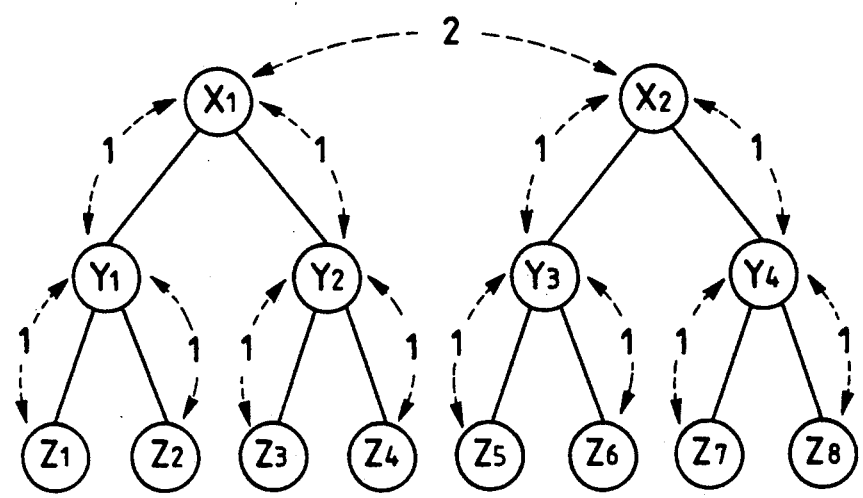
FIG. 12 is a view of a tree model depicting how the distance between neurons is defined.

The distance between neurons is defined in order to express optimum allocation conditions, as shown in FIG. 12. For example, the distance d (X1, Z5) between X1 and Z5 is given as $$d(X1, Z5) = d(X1, X2) + d(X2, Y3) + d(Y3, Z5)$$
$$= 2 + 1 + 1 = 4$$

As indicated, defining the distance between neurons so as to optimally allocate calls is equivalent to minimizing the total sum of the distances between all calls that are generated (i.e., neuron output=1). The total sum of call-to-call distances is made to correspond to the magnitude of the energy function, as expressed by the equation:

$$E_4 = \frac{K_4}{2} \left[ d(A, B) \sum_{i=1}^{2} Vxi + \sum_{i=1}^{4} Vyi + \sum_{i=1}^{8} Vzi \right] \quad (7)$$

where, $K_4$ is a positive constant, and A and B represent Xi, Yj or Zk each. Thus the energy function E is obtained as the sum of $E_1$ through $E_4$.

$$E = E_1 + E_2 + E_3 + E_4 \quad (8)$$

If $K_1$, $K_2$ and $K_3$ are sufficiently large, the calls are allocated without conflict. When $E_1 = E_2 = E_3 = 0$ and E ($= E_4$) takes on a minimum value, the total sum of call-to-call distances becomes minimal. It is at this point that optimum call allocation patterns are obtained from the outputs $V_{X1}$ through $V_{Z8}$ of the neurons.

Equation (8) is rewritten to the format of equation (2) to find coupling conductance T and external input current I. The results are used to constitute the analog circuit of FIG. 13. In this case, the conductance Tij is negative as opposed to the value of Tij being positive when the polarity of the output from the amplifiers representing the neurons is inverted. "i" and "j" represent the following:

$$i = X1, X2, Y1, Y2 \ldots, Y4, Z1, Z2 \ldots, Z8 \quad (9)$$
$$j = X1, X2, Y1, Y2 \ldots, Y4, Z1, Z2 \ldots, Z8$$

Figure 16:
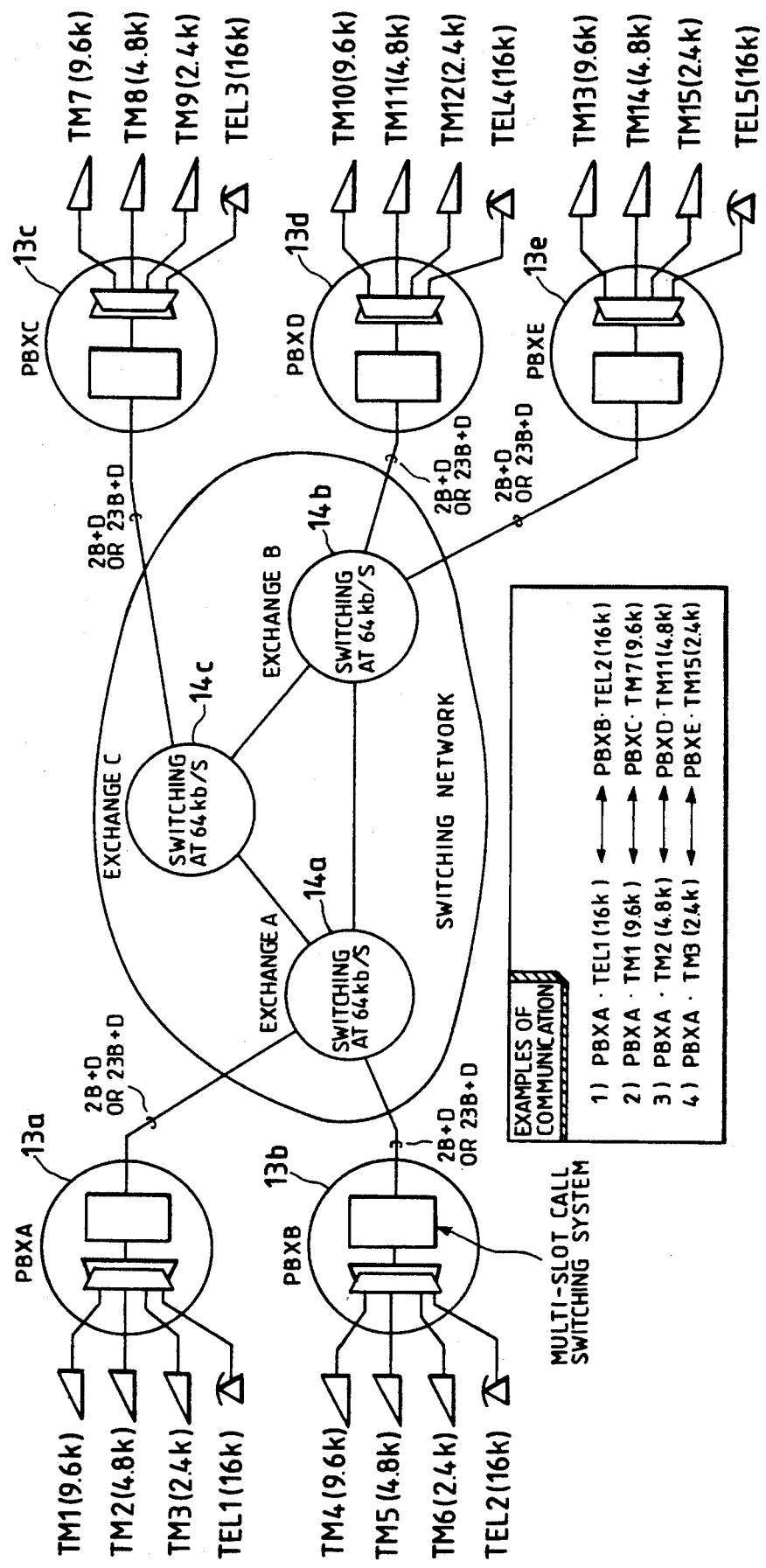
FIG. 16 is a view of typical communications carried out between PBXs having the multi-slot call switching system each.

The parameters given in FIG. 13 are indicated below, along with the equations containing constants T and I supplied to the neural network of FIG. 16.

$$T_{xi,xi} = -\frac{K_2}{2} + 8K_3 \quad (i = 1, 2)$$

$$T_{yi,yi} = -\frac{K_2}{2} + 2K_3 \quad (i = 1, 2, 3, 4)$$

$$T_{zi,zi} = -\frac{K_2}{2} + \frac{K_1}{2} \quad (i = 1, 2, \ldots 8)$$

$$T_{xi,zj} = -(K_2 + 4K_3 + 2K_2) \quad \begin{array}{l}(i = 1, j = 5, 6, 7, 8) \text{ or} \\ (i = 1, 2, j = 1, 2, 3, 4)\end{array}$$

$$T_{yi,zj} = -K_2 + 2K_3 + \frac{5}{2} K_4 \quad \begin{array}{l}(i = 1, j = 5, 6, 7, 8) \text{ or} \\ (i = 1, 2, j = 1, 2, 3, 4)\end{array}$$

$$T_{xi,zj} = -K_2 + 8K_3 + \frac{3}{2} K_4 \quad \begin{array}{l}(i = 1, j = 3, 4) \text{ or} \\ (j = 2, j = 1, 2)\end{array}$$

$$T_{zi,zj} = -(K_2 + K_3 + 3K_4) \quad (i = 1, 2, 3, 4, j = 5, 6, 7, 8)$$

$$T_{yi,yj} = -(K_2 4K_3 + 2K_4) \quad (i = 1, 2, j = 3, 4)$$

$$T_{yi,zj} = -\frac{K_1}{2} + K_2 + 2K_3 + \frac{K_4}{2} \quad \begin{array}{l}(i = 1, 2, 3, 4, \\ j = 2i, 2i - 1)\end{array}$$

$$T_{xi,zj} = -\frac{K_2}{2} + K_2 + 4K_3 + K_4 \quad \begin{array}{l}(i = 1, j = 1, 2, 3, 4) \text{ or} \\ (i = 1, 2, j = 5, 6, 7, 8)\end{array}$$

$$T_{xi,yj} = -\frac{K_1}{2} + K_2 + 8K_3 + \frac{K_4}{2} (i = 1, 2, j = 2i, 1i - 1)$$

$$T_{xi,xj} = -(K_2 + 4K_3 + K_4) \quad (i = 1, 3, j = i + 1)$$
$$T_{zi,zj} = -(K_2 + K_3 + K_4) \quad (i = 1, 3, 5, 7, j = i + 1)$$

$$T_{zi,zj} = -(K_2 + K_3 + 2K_4) \quad \begin{array}{l}(j = 1, 2, j = 3, 4) \text{ or} \\ (i = 5, 6, j = 7, 8)\end{array}$$

$$T_{yi,zj} = -K_2 + 2K_3 + \frac{3}{2} K_4 \quad \begin{array}{l}(i = 1, j = 3, 4) \\ \text{or } (i = 2, j = 1, 2) \\ \text{or } (i = 3, j = 7, 8) \\ \text{or } (i = 4, j = 5, 6)\end{array}$$

$$I_{xi} = NK_2 + 4GK_3 \quad (i = 1, 2)$$

$$I_{yi} = NK_2 + 2GK_3 \quad (i = 1, 2, 3, 4)$$

$$I_{zi} = NK_2 + GK_3 \quad (i = 1, 2, \ldots, 8)$$

(where $N = NX + NY + NZ$, $G = 4NX + 2NY + NZ$)

In this embodiment, the address controller of FIG. 13 is utilized as that shown in FIG. 1. This controller provides optimum call allocation information.

IV. Construction of address controller circuits (b)

What follows is a detailed description of a second embodiment of the address controller according to the invention.

IV. 1. Neural network

Prior to the description of the controller construction, the requirements for the neural network constituting the address controller circuits in the second embodiment of the address controller are discussed below.

Figure 14A:
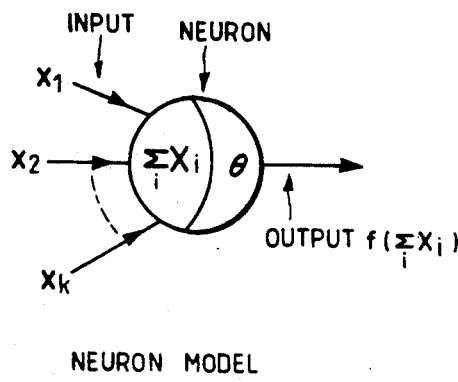
FIG. 14(a) is a view of a neuron model.
Figure 14B:
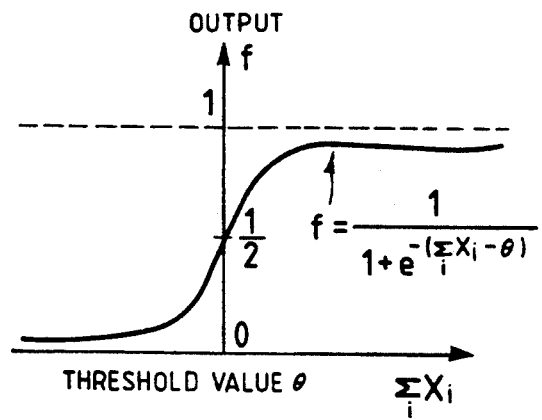
FIG. 14(b) is a view of the input/output characteristic of a model neuron cell.

As shown in FIG. 14(a), each neuron has a plurality of inputs and one output. When the total sum of inputs exceeds a threshold value $\theta$, the output rises rapidly. This characteristic is approximated by the function depicted in FIG. 4(b). These neurons are interconnected with links having a weight coefficient Wji each to constitute a neural network. The subscripts "j" and "i" of the notation Wji indicate that the coefficient concerns the link between neuron "i" and neuron "j." As an example, FIG. 14(c) indicates a neural network of the feed-forward construction. When an input is given to each neuron in the input layer of this neural network, each neuron, depending on the input, transmits to the corresponding neuron in the downstream hidden layer each output multiplied by the link weight coefficient Wji. In this manner, values are transmitted from the input layer to the output layer.

When this neural network of the feed-forward construction is made to learn the inverse propagation of errors, an input pattern vector $P = \{P_1, P_2, \ldots P_n\}$ is allowed to correspond to a given output pattern vector $O = \{O_1, O_2, \ldots, O_n\}$ on a one-to-one or a plurality-to-one basis. Below is a descripton of the algorithm for learning the inverse propagation of errors.

IV. 2. The back propagation algorithm

The back propagation algorithm is discussed in detail by such publications as "Recognition and Learning" (Chapter 10, Vol. 16, by Yuichiro Anzai, of Iwanami Lectures on Software Science). To the above-described feed-forward neural network comprising the input layer, hidden layer and output layer, the back propagation algorithm may be applied using the steps [1] through [8] discussed below. [1] In response to an input pattern $P_1$ presented, the output of each neuron is successively computed from the input toward the output layer.

[2] For the pattern P of each neuron "j" in the output layer, an error $\delta pj$ is compute between the actual output Opj and its ideal output rpj. The ideal output rpj is called a teacher signal.

[3 9 A coupling coefficient Wij is set for the link connecting the output of neurons "j" to the input of neurons "i". For neurons "j" in the output layer, equation (10) below is derived from the error $\delta pj$ and from the actual output Opj:

$$\Delta pWji = \alpha \delta pj Opj \quad (10)$$

where, $\alpha$ is a positive constant. Using equation (10), the amount of change $\Delta pWji$ in the weight going into neurons "j" of the output layer from neurons "i" of the hidden layer is obtained.

[4] The weight Wji for all links going into neurons "j" of the output layer is changed to Wji+ΔpWji.

[5] For neurons "j" of the hidden layer, equation (11) below is used to compute the error pj.

$$\delta pj = f'\left(\sum_o Wji\, Opj\right) \sum_m \delta pm\, Wmj \qquad (11)$$

where, $$f(x) = \frac{1}{1 + e^{-(x-\theta)}}$$

f' represents the differential of f(x).

[6] For neurons "j" of the hidden layer computed in step [5] above, the amount of change δpWji in the weight of the link going directly into neurons "j" is obtained using the error Δpj and the actual output Opj in equation (1).

[7] For neurons "j" of the hidden layer computed in step [6] above, the weight Wji each link going into neurons "j" is changed to Wji+ΔpWji.

[8] Steps [1] through [7] above are repeated for each item of the input/output data so that the weight of every link may be repeatedly changed. Finally, when the total sum of errors to the second power $$\sum_p pj^2$$

falls below a certain value, the learning is considered to be completed.

When the input pattern vector P is applied to the network that has completed the above-described learning, the corresponding output Op appears in the output layer.

IV. 3. Application of back propagation neural network to address controller

The back error propagation neural network discussed above is supplied with the call generation pattern in the tree model and with newly generated call types (X, Y, Z) as an input pattern vector. Furthermore, the ideal output corresponding to the input pattern is provided as a teacher signal so that the network may utilize the algorithm of steps [1] through [8] above to learn the pattern.

FIG. 15 is a set of views depicting an illustrative ideal output (teacher signal) in the form of a tree model. FIG. 15(a) shows that two calls, Z1 and Z3, are currently carried. If a call Y is generated anew, call Z3 is relocated to Z2 to make room for Y2 (area made up of Z3 and Z4) so that Y2 may carry the new call Y, as shown in FIG. 15(b). In this case, the input pattern vector P and the ideal output vector rp corresponding thereto are expressed as follows.

$$P = (X1, Y1, Y2, Z1, Z2, Z3, Z4, x, y, z)$$
$$= (0, 0, 0, 1, 0, 1, 0, 0, 1, 0)$$
$$rp = (X1, Y1, Y2, Z1, Z2, Z3, Z4)$$
$$= (0, 0, 1, 1, 1, 0, 0)$$

The components X1, Y1, Y2, Z1, Z2, Z3 and Z4 constitute the tree model. The components x, y and z represent newly generated calls. In any of the components of the vectors P and Op, a "1" stands for the presence of a call and a "0" for the absence thereof.

Once the neural network has completed its learning using the above input pattern vector P and ideal output vector rp, the network may be used to determine both the allocation of calls and the relocation thereof. What was described above is an example in which one frame contains four basic switching units for the sake of simplified explanation.

Table 4 below lists the numbers of neurons that exist in the input, hidden and output layers of this example. Table 5 below lists the weight coefficient of the links and the threshold value of the neurons. W1[j][i] stands for the weight coefficient of the link connecting neurons "i" of the input layer to neurons "j" of the hidden layer, and W2[j][i] represents the weight coefficient of the link connecting neurons "i" of the hidden layer to neurons "j" of the output layer. Bias 2[i] stands for the threshold value of the neuron "i" of the hidden layer, and bias 3[j] represents the threshold value of the neuron "j" of the output layer.

TABLE 4

| Layer | No. of neurons | Remarks |
|---|---|---|
| Input layer | 10 | Seven neurons in the input layer indicate the locations of already existing calls in the tree model. |
| Hidden layer | 5 | |
| Output layer | 7 | The remaining three represent the generation of call types X, Y and Z, respectively. Seven neurons in the output layer indicate the locations of the allocated or relocated calls in the tree model. |

TABLE 5

| | |
|---|---|
| w21[0][0] = | −0.298883 |
| w21[0][1] = | −6.209548 |
| w21[0][2] = | −2.192376 |
| w21[0][3] = | 2.301134 |
| w21[0][4] = | 2.167200 |
| w21[0][5] = | −0.389574 |
| w21[0][6] = | 3.555711 |
| w21[0][7] = | 2.055203 |
| w21[0][8] = | −4.083644 |
| w21[0][9] = | 1.333673 |
| w21[1][0] = | −0.211777 |
| w21[1][1] = | −0.830328 |
| w21[1][2] = | 2.517203 |
| w21[1][3] = | 3.114686 |
| w21[1][4] = | 5.044575 |
| w21[1][5] = | −2.855261 |
| w21[1][6] = | −8.763849 |
| w21[1][7] = | 1.815746 |
| w21[1][8] = | 4.556701 |
| w21[1][9] = | −2.630201 |
| w21[2][0] = | −0.252757 |
| w21[2][1] = | −0.69038 |
| w21[2][2] = | 8.141650 |
| w21[2][3] = | 2.487375 |
| w21[2][4] = | 6.700565 |
| w21[2][5] = | 2.634156 |
| w21[2][6] = | 10.275603 |
| w21[2][7] = | −2.021126 |
| w21[2][8] = | 1.302611 |
| w21[2][9] = | −4.672584 |
| w21[3][0] = | 0.129450 |
| w21[3][1] = | 4.320780 |
| w21[3][2] = | −4.020517 |
| w21[3][3] = | −10.443781 |
| w21[3][4] = | −10.526759 |
| w21[3][5] = | 3.090064 |
| w21[3][6] = | 4.539859 |
| w21[3][7] = | 3.021275 |
| w21[3][8] = | 0.201832 |
| w21[3][9] = | −2.116437 |
| w21[4][0] = | 0.134468 |
| w21[4][1] = | −4.794602 |
| w21[4][2] = | 3.178651 |

TABLE 5-continued

| | |
|---|---|
| w21[4][3] = | −3.222516 |
| w21[4][4] = | −3.188218 |
| w21[4][5] = | −8.111369 |
| w21[4][6] = | 1.206850 |
| w21[4][7] = | 2.154476 |
| w21[4][8] = | 2.531883 |
| w21[4][9] = | −0.561334 |
| w32[0][0] = | 4.555224 |
| w32[0][1] = | 2.319753 |
| w32[0][2] = | −6.856193 |
| w32[0][3] = | 5.482346 |
| w32[0][4] = | 1.714726 |
| w32[1][0] = | −12.206596 |
| w32[1][1] = | −1.600695 |
| w32[1][2] = | 0.413821 |
| w32[1][3] = | 7.890306 |
| w32[1][4] = | 2.131308 |
| w32[2][0] = | −7.915265 |
| w32[2][1] = | 4.347736 |
| w32[2][2] = | 4.697437 |
| w32[2][3] = | −10.485679 |
| w32[2][4] = | 4.469182 |
| w32[3][0] = | 10.088903 |
| w32[3][1] = | 4.945045 |
| w32[3][2] = | −5.802973 |
| w32[3][3] = | −13.742233 |
| w32[3][4] = | −5.628826 |
| w32[4][0] = | 7.311315 |
| w32[4][1] = | 0.419300 |
| w32[4][2] = | 8.684487 |
| w32[4][3] = | −10.548146 |
| w32[4][4] = | −5.512566 |
| w32[5][0] = | 7.787358 |
| w32[5][1] = | −3.746096 |
| w32[5][2] = | 0.129396 |
| w32[5][3] = | 9.412850 |
| w32[5][4] = | −14.034076 |
| w32[6][0] = | 7.093916 |
| w32[6][1] = | −11.052551 |
| w32[6][2] = | 9.667763 |
| w32[6][3] = | 5.709406 |
| w32[6][4] = | −6.650675 |
| bias 2[0] = | −0.890964 |
| bias 2[1] = | 3.625742 |
| bias 2[2] = | −5.306657 |
| bias 2[3] = | 1.034148 |
| bias 2[4] = | 3.860530 |
| bias 3[0] = | −10.698458 |
| bias 3[1] = | −3.361836 |
| bias 3[2] = | −3.874239 |
| bias 3[3] = | 3.306429 |
| bias 3[4] = | −0.617121 |
| bias 3[5] = | −0.155877 |
| bias 3[6] = | −1.865987 |

Figure 14C:
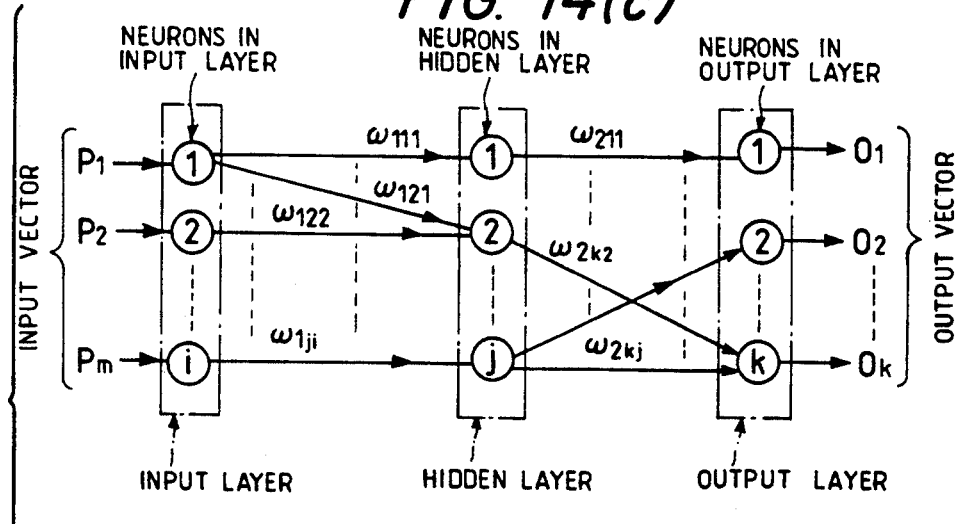
FIG. 14(c) is a block diagram of a neural network of the feed-forward construction.

The neural network of the feed-forward construction in FIG. 14(c) using the above-described link weight coefficients is applied to the address controller shown in FIG. 1. This address controller provides relocation information whereby the number of times calls are relocated is minimized.

V. Transmission equipment that uses multi-slot call switching system

The multi-slot call relocation control method according to the present invention may be applied to time-division multipliers that multiplex audio, data and video signals for transmission to their destinations in time-division format at 64 kb/s to 6 Mb/s over high-speed digital circuits, leased in Japan from a Class 1 Common Carrier. This method will now be described in detail with reference to FIG. 18 where an embodiment of such time-division multiplexer equipment is illustrated.

Figure 18:
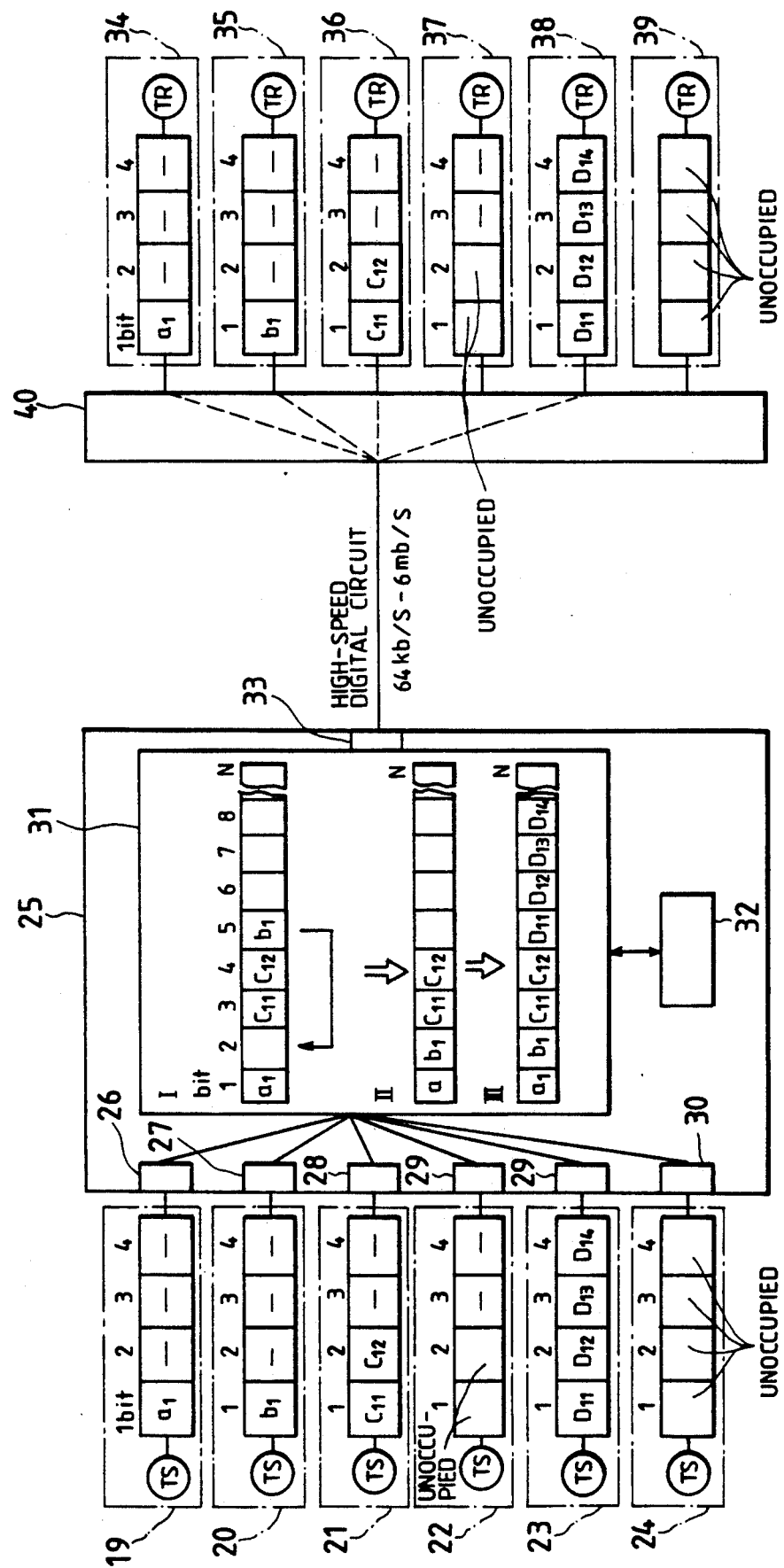
FIG. 18 is a block diagram of a time-division multiplexer to which the multi-slot call switching system according to the invention is applied.

In FIG. 18, reference numerals 19, 20, 34 and 35 are terminals with a bearer rate of 8 kb/s; 21, 22, 36 and 37 are terminals with a bearer rate of 16 kb/s; and 23, 24, 38 and 39 are terminals with a bearer rate of 32 kb/s. Numerals 25 and 40 are a time-division multiplexer each, 26 through 30 are terminal interfaces, 31 is a multiplexing switch, 32 is a multiplexing controller, and 33 is a line interface. Under control of the multiplexing controller 32, the terminals with different bearer rates are interconnected via the terminal interfaces 26 through 30 for transmission over high-speed digital circuits. Time slots (or bits) are fixedly assigned to the high-speed digital circuits. More specifically, the terminals 19 and 20 having the bearer rate of 8 kb/s and the terminals 21 with the bearer rate of 16 kb/s are multiplexed by the multiplexing switch 31 via the terminal interfaces 26 through 28. These terminals are connected to the high-speed digital circuits via the line interface 33; the terminals are also connected via the time-division multiplexer 40 to the terminals 34 and 35 with the bearer rate of 8 kb/s and to the terminal 36 with the bearer rate of 16 kb/s. When the terminal 23 with the bearer rate of 32 kb/s issues a connection request to the multiplexing controller 32 via the terminal interface 29, the controller 32 judges that the assignment of the bearer rate of 32 kb/s is possible. Operating on the multi-slot call relocation control method according to the invention, the multiplexing switch 32 relocates calls in its bit configuration II, as shown. The relocation involves changing $b_1$ of bit 5 to $b_1$ of bit 2. The multiplexing controller 32 receives the old and new bit information in effect before and after the relocation, as well as the information about the terminal interfaces of the time-division multiplexer 40. The information is set by the multiplexing controller 32 to an N-bit configuration (of a plurality of bits) that is fixedly assigned the high-speed digital circuits for transmitting and receiving relocation information. After being set, the information is sent to the time-division multiplexer 40. As soon as the assigning of the bits becomes possible, the terminal 23 with the bearer rate of 32 kb/s is assigned the bits as depicted in the bit configuration III of the multiplexing switch 40 by way of the terminal interface 29. This allows the terminal 23 to be connected to the terminal 38 with the bearer rate of 32 kb/s via the line interface 31 and the time-division multiplexer 40. In this manner, unoccupied slots (or bits) of the high-speed digital circuits are utilized efficiently, and economical time-division multiplexing equipment is implemented.

The present invention affords a number of advantages, some of which will now be outlined.

There are two ways to carry out multi-slot call switching over digital circuits: (1) equipping each PBX with a multi-slot call switching system, or (2) installing multi-slot call switching systems within the public telecommunication network. FIG. 16 shows an example in which communications are exchanged between PBXs each having a multi-slot call switching system. Each PBX is connected to the public telecommunication network via an I interface (BRI or PRI). The basic switching unit of the network is 64 kb/s. It follows that for communication between PBX A and any of PBXs B through E, a minimum of four B channels need to be installed between PBX A and the public telecommunication network. One advantage of equipping each PBX with a multi-slot call switching system is that multi-slot call switching may be performed without modifying the existing public telecommunication network.

Figure 17:
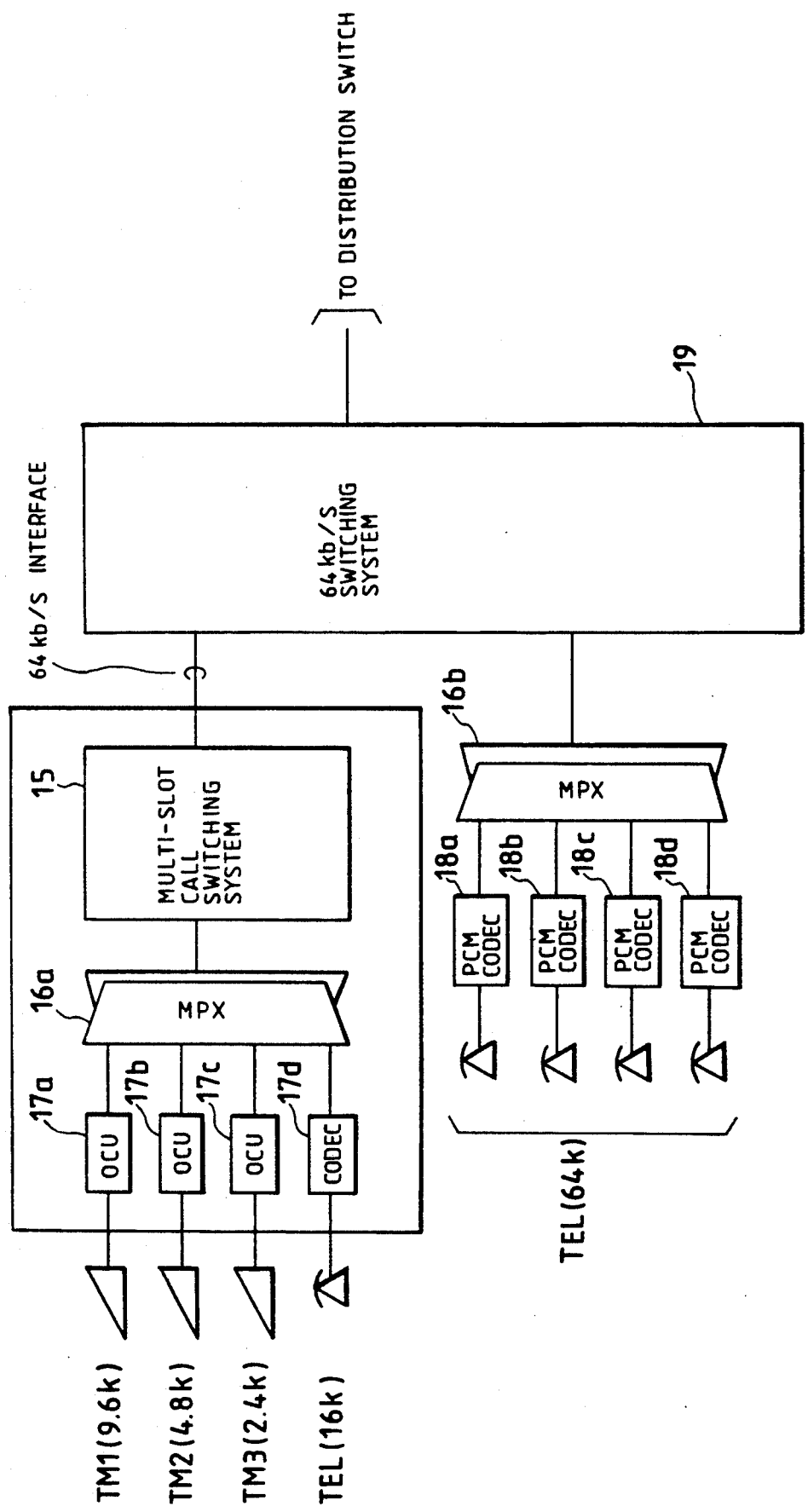
FIG. 17 is a block diagram of a line concentrating switch equipped with the multi-slot call switching system.

As the number of PBXs performing multi-slot call switching grows, the number of necessary B channels must also be increased. One problem with this case is that the utilization factor of the telecommunication equipment drops with respect to less frequent users of calls at 64 kb/s. However, this problem is solved by attaching a multi-slot call switching system to each LS exchange in the public telecommunication network. That is, part of a line concentrating switch in each LS exchange is modified to permit multi-slot call switching. FIG. 17 is a typical exchange configuration comprising a 64 kb/s line concentrating switch supplemented by a multi-slot call switching system. This configuration minimizes modifications that need to be made to the existing LS exchange.

The time-division multiplexer uses high-speed digital circuits, leased in Japan from a Class 1 Common Carrier, to transmit audio, visual and data signals to their destinations, multiplexed in time division format at 64 kb/s to 6 Mb/s. With conventional time-division multiplexers, terminals having a plurality of bearer rates are multiplexed by a multiplexing switch via terminal interfaces, and time slots are fixedly assigned to high-speed digital circuits. There is a case, as shown in FIG. 18, in which the terminals 19 and 29 with the bearer rate of 8 kb/s and the terminal 21 with the bearer rate of 16 kb/s are assigned to the bit configuration I of the multi-slot call switching system. In this case, the terminals with the bearer rate of 32 kb/s cannot be used. Thus the more terminals are attached, the greater the possibility of being unable to carry calls even though there are time slots (bits) that remain unoccupied. This constraint on the multiplexing operation is the same in nature as that on the multi-slot call switching. The constraint may also be circumvented by applying the relocation control method to the multiplexing switch in the time-division multiplexer, as shown in FIG. 18. Under this scheme, calls are relocated in the bit configuration II of the multiplexing switch II, and unoccupied circuits are captured so that calls at 32 kb/s from a terminal with the bearer rate of 32 kb/s may be carried through the allocation of the bit configuration III. This permits transmission circuits to be utilized efficiently.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

We claim:

1. A multi-slot call relocation control method for multiplexing newly generated multi-slot calls within a frame having a predetermined number of time slots on a transmission channel comprising the steps of:

storing in a memory circuit, combinations of locating positions of already allocated multi-slot calls, a number of time slots of the newly generated multi-slot calls and a relocating position in respect to each of said combinations, by allocating said multi-slot calls at the locating positions when the number of non-allocated time slots within said frame is more than the number of time slots of the newly generated multi-slot calls and when other multi-slot calls are not allocated at the locating positions where said newly generated multi-slot calls can be located, relocating said other multi-slot calls to other vacant locating positions when the number of non-allocated time slots within said frame is more than the number of time slots of said newly generated multi-slot calls and when other multi-slot calls with fewer time slots than the number of time slots of said newly generated multi-slot calls are allocated at the locating positions where said newly-generated multi-slot calls can be allocated and allocating said newly generated multi-slot calls to the locating positions where they can be allocated;

determining a relocating position in response to a stored content of said memory circuit when a new multi-slot call is generated during communication; and allocating the newly generated multi-slot call during communication in response to said determination.

2. A multi-slot call relocation control method according to claim 1, further comprising the steps of:

prior to said storing step, studying each of the most suitable relocating positions through a specific algorithm in response to combinations of locating positions of already allocated multi-slot calls and the number of time slots of newly generated multi-slot calls.

3. A multi-slot call relocation control method for multiplexing newly generated multi-slot calls within a plurality of frames having a certain number of time slots on a transmission channel comprising the steps of:

storing in a memory circuit, combinations of locating positions of already allocated multi-slot calls, a number of time slots of the newly generated multi-slot calls and a relocating position in respect to each of said combinations, by allocating said multi-slot calls at the locating positions when the number of non-allocated time slots within said plurality of frames is more than the number of time slots of the newly generated multi-slot calls and when other multi-slot calls are not allocated at the locating positions within one frame where said newly generated multi-slot calls can be allocated, relocating said other multi-slot calls to other vacant locating positions when the number of non-allocated time slots within said plurality of frames is more than the number of time slots of said newly generated multi-slot calls and when other multi-slot calls with fewer time slots than the number of time slots of said newly generated multi-slot calls are allocated at the locating positions within one frame where said newly generated multi-slot calls can be allocated and allocating said newly generated multi-slot calls to the locating positions within one frame where they can be allocated;

determining a relocating position in response to a stored content of said memory circuit when a new multi-slot call is generated during communication; and allocating the newly generated multi-slot call during communication in response to said determination.

4. A multi-slot call relocation control method according to claim 3, further comprising the step of:

studying each of the most suitable relocating positions through a predetermined algorithm in response to combinations of a relocating position of an already allocated multi-slot call and the number of time slots of the newly generated multi-slot calls prior to said storing step.

5. A multi-slot call relocation control method according to claim 1, further comprising the steps of:

sequencing at a rate of $64 \text{ kb/s} \times 2^{-i}$ (i: integer) multi-slot calls which have bearer rates different from each other; and using as a basic switching unit a multi-slot call having the lowest bearer rate from among said sequenced multi-slot calls.

6. A multi-slot call relocation control method for multiplexing newly generated multi-slot calls occupying $2^N$ time slots (N: positive integer) within a frame having $2^M$ time slots (M: positive integer; N<M) on a transmission channel comprising the steps of:

storing in a memory circuit, combinations of locating positions of already allocated multi-slot calls, a number of time slots of the newly generated multi-slot calls and a relocating position in respect to each of said combinations, by allocating said multi-slot calls at the locating positions when the number of non-allocated time slots within said frame is more than $2^N$ and when other multi-slot calls are not allocated at the locating positions where multi-slot calls occupying said $2^N$ time slots are allocated and by allocating the multi-slot calls occupying said $2^N$ time slots at the locating positions where they may be located after said other multi-slot calls are relocated at other vacant locating positions when the number of non-allocated time slots is $2^N$ or more within said frame and when other multi-slot calls having less than $2^N$ time slots are allocated at the locating positions where the multi-slot calls occupying said $2^N$ time slots can be allocated;

determining a relocating position in response to a stored content of said memory circuit when a new multi-slot call is generated during communication; and allocating the newly generated multi-slot call during communication in response to said determination.

7. A multi-slot call relocation control method according to claim 6, further comprising the steps of:

prior to said storing step, based on combinations of locating positions of already allocated multi-slot calls and the number of time slots of newly generated multi-slot calls, studying a relocating position for allocating the multi-slot calls occupying said $2^N$ time slots after relocating other multi-slot call at a locating position having a maximum number of n allocatable positions when the number of time slots of other multi-slot calls present at a plurality of positions where multi-slot calls occupying $2^N$ time slots can be located is expressed by $2N^{-n}$ (where, $1 \leq n \leq N$, n: integer) when the number of non-allocated time slots within a frame is $2^N$ or more and when other multi-slot calls less than 2N time slots are allocated at positions where the multi-slot calls occupying said $2^N$ time slots can be allocated.

8. A multi-slot call relocation control method for multiplexing newly generated multi-slot calls occupying $2^N$ time slots (N: positive integer) within a frame having $2^M$ time slots (M: positive integer: N<M) on a transmission channel comprising the steps of:

storing in a memory circuit, combinations of locating positions of already allocated multi-slot calls, a number of time slots of newly generated multi-slot calls and a relocating position in respect to each of said combinations, by allocating said multi-calls at the positions when the number of non-allocated time slots within said plurality of frames is more than $2^N$ and when other multi-slot calls are not located at the locating positions within one frame where multi-slot calls occupying said $2^N$ time slots are located and by locating the multi-slot calls occupying $2^N$ time slots at the locating positions within one frame where they may be located after said other multi-slot calls are relocated at other vacant positions within said plurality of frames when the number of non-located time slots is $2^N$ or more within said plurality of frames and when other multi-slot calls less than $2^N$ time slots are located at the positions within one frame where the multi-slot calls occupying said $2^N$ time slots can be located;

determining a relocating position in response to a stored content of said memory circuit when a new multi-slot call is generated during communication; and locating the newly generated multi-slot call during communication in response to said determination.

9. A multi-slot call relocation control method according to claim 8; further comprising the steps of:

prior to said storing step, based on combinations of locating positions of already located multi-slot calls and the number of time slots of newly generated multi-slot calls, studying a relocating position for locating the multi-slot calls occupying said $2^N$ time slots after relocating other multi-slot calls at a position having a maximum number of n locatable positions when the number of time slots of other multi-slot calls present at a plurality of positions where multi-slot calls occupying $2^N$ time slots can be located is expressed by $2^{N-n}$ (where, $1 \leq n \leq N$, n: integer) when the number of non-located time slots within said plurality of frames is $2^N$ or more and when other multi-slot calls less than $2^N$ time slots are located at positions within one frame where the multi-slot calls occupying said $2^N$ time slots can be located.

10. A multi-slot call switching system comprising:

a channel memory for writing and reading thereto and therefrom data of a plurality of calls allocated in units of frames, thereby outputting data of a selected frame to a data highway;

a call controller for controlling location information about calls to be switched within a given frame and for controlling call information such as rates of generated and terminated calls;

a pre-address control memory for receiving and storing said call information coming from said call controller;

an address controller for storing, as stored information, combinations of locating positions of already located multi-slot calls and time slot numbers of newly generated multi-slot calls in relation to a relocating position for each of said combinations, determining a position of each of the calls on the frame of non-located channel memory, outputting positional information for each of the calls and outputting location information of each of the calls to be relocated in response to said stored information when a new call is generated; and a post-address control member for converting location information received from the address controller into address information and outputting it to the channel memory.

11. A multi-slot call switching system according to claim 10, wherein said stored information is set by studying each of the most suitable relocating positions through a specific algorithm in response to combinations of locating positions of already located multi-slot calls and the time slot number of the newly generated multi-slot calls.

12. A multi-slot call switching system according to claim 11, wherein said address controller includes a neural network for studying said relocating positions, memorizing said relocating positions and determining said relocating positions.

13. A multi-slot call switching system according to claim 11, wherein a relocating position determined by said algorithm is determined such that the number of non-located time slots within said frame is more than the number of time slots of the newly generated multi-slot calls and if other multi-slots calls are not located at positions where the number of time slots of said newly generated multi-slot calls can be located, they are the non-located positions, and wherein when the number of non-located time slots within said frame is more than the number of time slots of said newly generated multi-slot calls and when other multi-slot calls less then the number of time slots of said newly generated multi-slot calls are located at the positions where the number of time slots of said newly generated multi-slot calls can be located, the positions of said newly generated multi-slot calls are said locatable positions and the positions of said other multi-slot calls are positions of each of the calls where said other multi-slot calls are relocated at other vacant positions.

14. A multi-slot call switching system according to claim 11, wherein a relocating position determined by said algorithm is determined such that the number of non-located time slots within said frame is more than 2N (N: a positive integer) and when other multi-slot calls are not located at positions where the multi-slot calls occupying said $2^N$ time slots can be located, they are the non-located positions; and wherein when the number of non-located time slots within said frame is more than $2^N$ and when other multi-slot calls less than $2^N$ time slots are located at the positions where the multi-slot calls occupying said $2^N$ time slots can be located, the position of said newly generated multi-slot calls are said locatable positions and the location information of said other multi-slot calls is a position of each of the calls where said other multi-slot calls are relocated at other vacant positions.

15. A multi-slot call switching system according to claim 14, wherein a relocating position determined by said algorithm is determined such that when the number of non-located time slots within a frame is more than $2^N$ and when other multi-slot calls less than $2^N$ time slot are located at the positions where the multi-slot calls occupying said $2^N$ time slots can be located, the positions of said newly generated multi-slot calls are positions where the maximum number of n locatable positions and the positions of said other multi-slot calls are positions of each of the calls where said other multi-slot calls are relocated at other vacant positions when the number of time slots of other multi-slot calls where the multi-slot calls occupying $2^N$ time slots are present at said plurality of locatable positions is expressed as $2^{N-n}$ ($1 \leq n \leq N$, n is an integer).

16. A multi-slot call switching system according to claim 15, wherein said address controller includes a neural network for studying a relocating position of a call having the maximum value of n, memorizing said relocating position and determining said relocating position.

17. A multi-slot call switching system according to claim 10, further comprising:
    means for transmitting location information outputted from said address controller to an opposing multi-slot call switching system.

18. A multi-slot call switching system according to claim 10, wherein said channel memory is so controlled as to operate on a random write, sequential read basis.

19. A multi-slot call switching system according to claim 10, further comprising:
    an address position changing circuit for receiving location information of each of the calls relocated by an opposing multi-slot call switching system and changing a read-out information of said channel memory; and
    wherein a writing and a reading-out of data of a plurality of calls located in a frame unit from a highway is performed to and form said channel memory.

20. A multi-slot call switching system according to claim 19, wherein writing control for said channel memory is carried out in a sequential write manner and reading-out control is carried out in a sequential read manner.

21. A transmission system comprising:
    a plurality of terminal interfaces for accommodating a plurality of terminals with a plurality of bearer rates different from each other;
    a line interface for interfacing digital circuits to a multiplexing switch;
    said multiplexing switch for multiplexing data from said terminal interface to a high speed digital circuit under control of a multiplexing controller; and
    said multiplexing controller for storing information including combinations of locating positions of already located data, a number indicating an amount of information of newly generated data and a relocating position in respect to each of said combinations, controlling said multiplexing switch so as to fixedly assign data from said terminal interface said digital circuit, determining information of each data to be relocated in accordance with said stored information when a new request of connection from the terminal interface is generated and assigning data from the terminal interface to which a new request for connection is made.

22. A transmission system according to claim 21, wherein said multiplexing controller has means for outputting to said digital circuits the relocation information constituted by location information about assigned data, by bearer rates, and by data assignment information about said terminal interfaces.

23. A transmission system according to claim 21, wherein said multiplexing controller controls said multiplexing switch in response to a relocation information received from said digital circuits thtrough said line interface.

* * * * *